United States Patent
Fujibayashi et al.

(10) Patent No.: US 7,527,876 B2
(45) Date of Patent: May 5, 2009

(54) SURFACE-TREATED STEEL SHEET

(75) Inventors: Nobue Fujibayashi, Kanagawa (JP); Akira Matsuzaki, Chiba (JP); Satoru Ando, Hiroshima (JP); Syuji Nomura, Hiroshima (JP); Takahiro Kubota, Hiroshima (JP); Yoshikazu Morohoshi, Kanagawa (JP); Takashi Nakano, Kanagawa (JP); Takashi Okubo, Kanagawa (JP); Jun Akui, Kanagawa (JP)

(73) Assignees: JFE Steel Corporation, Tokyo (JP); Kansai Paint Co., Ltd., Amagasaki-Shi (JP)

( * ) Notice: Subject to any disclaimer, the term of this patent is extended or adjusted under 35 U.S.C. 154(b) by 0 days.

(21) Appl. No.: 11/899,570

(22) Filed: Sep. 6, 2007

(65) Prior Publication Data
US 2008/0063896 A1 Mar. 13, 2008

(30) Foreign Application Priority Data
Sep. 7, 2006 (JP) .............................. 2006-242998
May 21, 2007 (JP) .............................. 2007-134003

(51) Int. Cl.
B32B 15/00 (2006.01)
B21B 39/00 (2006.01)

(52) U.S. Cl. ...................... 428/615; 428/621; 428/632; 428/633; 428/653; 428/659; 428/660; 428/681; 428/219; 428/340; 428/700

(58) Field of Classification Search ................ 428/615, 428/632, 633, 650, 653, 659, 660, 681, 219, 428/340, 704
See application file for complete search history.

(56) References Cited

U.S. PATENT DOCUMENTS 7,077,895 B2 *   7/2006   Akui et al. .............. 106/287.19
2006/0185769 A1 *  8/2006   Nakayama et al. .......... 148/247

FOREIGN PATENT DOCUMENTS

| JP | 11-350157 A | 12/1999 |
| JP | 2000-026980 A | 1/2000 |
| JP | 2000-079370 A | 3/2000 |
| JP | 2000-129460 A | 5/2000 |
| JP | 2001-348672 A | 12/2001 |
| JP | 2002-053979 A | 2/2002 |
| JP | 2002-053980 A | 2/2002 |
| JP | 2004-091826 A | 3/2004 |

* cited by examiner

*Primary Examiner*—Timothy M Speer
*Assistant Examiner*—Gordon R Baldwin
(74) *Attorney, Agent, or Firm*—Drishauf, Holtz, Goodman & Chick, P.C.

(57) ABSTRACT

A surface-treated steel sheet is disclosed, including a zinc based plated steel sheet having thereon a surface-treated film containing titanium, nickel, aluminum and fluorine and having a film thickness of from 0.05 to 1.0 μm, the surface-treated film having a titanium deposition amount of from 0.01 to 0.5 g/m² and containing from 0.01 to 5 parts by mass of nickel, from 0.1 to 25 parts by mass of aluminum and from 1 to 500 parts by mass of fluorine relative to 100 parts by mass of titanium. This surface-treated steel sheet does not contain hexavalent chromium in the film thereof at all and has excellent heat discoloration resistance, corrosion resistance and resistance to blackening.

8 Claims, 1 Drawing Sheet

SURFACE-TREATED STEEL SHEET

BACKGROUND OF THE INVENTION

1. Field of the Invention

The present invention relates to a surface-treated steel sheet which is optimal for uses of automobiles, household electrical appliances and building materials. In particular, the invention relates to a surface-treated steel sheet of an environmental adaptation type which does not contain hexavalent chromium in a surface-treated film.

2. Description of the Related Art

On steel sheets for household electrical appliances, steel sheets for building materials and steel sheets for automobiles, for the purpose of enhancing corrosion resistance (for example, white rust resistance and red rust resistance), steel sheets in which a surface of a zinc based plated steel sheet or an aluminum based plated steel sheet is subjected to a chromate treatment with a treatment liquid containing, as a major component, chromic acid, bichromic acid or a salt thereof have hitherto been widely used. This chromate treatment is an economical treatment method having excellent corrosion resistance and capable of being relatively simply achieved.

The chromate treatment uses hexavalent chromium which is a substance subjective to the pollution control. But, since not only this hexavalent chromium is treated in a closed system in a treatment step, but it is possible to make the elution of chromium from a chromate film due to a sealing action by an organic film formed on an upper layer substantially zero, the human body or environment is not substantially polluted by the hexavalent chromium. However, with an increasing interest in the recent global environmental issue, not only conventional laws and regulations which attach importance to the working environment and wastewater treatment but laws and regulations which attach importance to the environmental load and environmental harmony are being started. Also, there is the historical background that manufacturers are evaluated in terms of a degree of contribution to the environment, and a move to reduce the use of heavy metals including hexavalent chromium is increasing.

Under such a background, a number of proposals regarding a technology for controlling white rust of a hexavalent chromium-free zinc based plated steel sheet (chromate-free technology) have been made. For example, Patent Documents 1 and 2 propose a surface treatment agent containing Al, a phosphorus compound, silica and an aqueous organic resin emulsion and a metal material applied therewith. Also, Patent Document 3 proposes a zinc based plated steel sheet prepared by applying and drying a mixed aqueous solution of a primary phosphate of a polyvalent metal and a metal oxide sol to form an amorphous film and then forming an organic coat layer. Furthermore, Patent Documents 4 and 5 propose a steel sheet prepared by forming, as a lower layer, a composite oxide film layer containing an oxide fine particle, phosphoric acid and/or a phosphoric acid compound and at least one metal selected from Mg, Mn and Al and forming, as an upper layer thereof, an organic film.

Patent Document 1: JP-A-11-350157
Patent Document 2: JP-A-2000-26980
Patent Document 3: JP-A-2000-129460
Patent Document 4: JP-A-2002-53979
Patent Document 5: JP-A-2002-53980

In uses to which a zinc based plated steel sheet is applied, parts which are heated in a temperature region of the melting point of zinc or higher (from about 500 to 600° C.) are present not a little. For example, in a heat exchanger in an outdoor unit of an air conditioner, in brazing of a copper pipe and an aluminum-made evaporator, for the purpose of preventing melting of aluminum caused due to heating using a gas burner, a zinc based plated steel sheet is disposed between the copper pipe and the evaporator such that a flame of the burner does not come into direct contact with aluminum. When the foregoing related-art surface-treated steel sheets are applied to such a use, since the film is composed mainly of an organic resin, it is discolored yellow or brown due to heat decomposition, whereby the appearance becomes poor. For that reason, it is substantially impossible to apply the related-art surface-treated steel sheets.

In order to solve such a problem, a chromate-free technology which is excellent in heat discoloration resistance is proposed. For example, Patent Documents 6 and 7 propose an inorganic-rich film containing, as major components, a primary phosphate and colloidal silica. Also, Patent Document 8 proposes a double-layered film in which an inorganic-rich film containing, as major components, a primary phosphate and colloidal silica is disposed as a lower layer and a silicate film and/or a silicon resin is disposed as an upper layer.

Patent Document 6: JP-A-2000-79370
Patent Document 7: JP-A-2001-348672
Patent Document 8: JP-A-2004-91826

However, the inorganic-rich films of Patent Documents 6 and 7 are extremely low on a level of corrosion resistance and are difficult for application as a replacement of the chromate film. On the other hand, though the double-layered film of Patent Document 8 is on a level of corrosion resistance on which it is applicable as a replacement of the chromate film, an expensive silica or silicon resin is used, and therefore, it is problematic from the standpoint of costs. Also, since the films which are brought by these technologies are easy to cause a phenomenon where the film is discolored black under a humid environment (blackening), they are difficult for application in a heat exchanger where dew condensation is easy to occur and are restricted with respect to the storage environment during transportation of products, and therefore, they are not practical useful.

SUMMARY OF THE INVENTION

Accordingly, an object of the invention is to solve the foregoing problems of the related art and to provide a surface-treated steel sheet which does not contain hexavalent chromium in a surface-treated film and from which excellent heat discoloration resistance, corrosion resistance and resistance to blackening are obtained.

The invention is concerned with a surface-treated steel sheet comprising a zinc based plated steel sheet having thereon a surface-treated film containing titanium, nickel, aluminum and fluorine and having a film thickness of from 0.05 to 1.0 µm, the surface-treated film having a titanium deposition amount of from 0.01 to 0.5 $g/m^2$ and containing from 0.01 to 5 parts by mass of nickel, from 0.1 to 25 parts by mass of aluminum and from 1 to 500 parts by mass of fluorine relative to 100 parts by mass of titanium.

In this surface-treated steel sheet, it is preferable that the surface-treated film contains at least one member selected from the group consisting of from 2 to 1,000 parts by mass of zirconium, from 1 to 300 parts by mass of phosphorus and from 1 to 300 parts by mass of vanadium relative to 100 parts by mass of titanium.

Also, the invention is concerned with a surface-treated steel sheet comprising a zinc based plated steel sheet or an aluminum based plated steel sheet having thereon a surface-treated film having a film deposition amount of from 0.1 to 2.0 $g/m^2$ as formed by applying and drying a surface treatment composition containing a titanium-containing aqueous liquid obtained by mixing at least titanium compound selected from the group consisting of a hydrolyzable titanium compound, a low condensate of a hydrolyzable titanium compound, titanium hydroxide and a low condensate of titanium hydroxide with aqueous hydrogen peroxide and from 0.01 to 10 parts by mass of a nickel compound, from 1 to 100 parts by mass of an aluminum compound and from 1 to 800 parts by mass of a fluorine-containing compound relative to 100 parts by mass of solids of the titanium-containing aqueous liquid.

In this surface-treated steel sheet, it is preferable that the fluorine-containing compound is at least one member selected from the group consisting of ammonium zirconium fluoride and zirconium hydrofluoride.

Also, in all of the foregoing surface-treated steel sheets, it is more preferable that the surface treatment composition further contains at least one member selected from the group consisting of from 1 to 400 parts by mass of an organic phosphoric acid compound, from 1 to 400 parts by mass of a vanadic acid and from 1 to 400 parts by mass of a zirconium carbonate compound relative to 100 parts by mass of solids of the titanium-containing aqueous liquid.

Furthermore, in all of the foregoing surface-treated steel sheets, it is more preferable that the surface treatment composition further contains not more than 30 parts by mass relative to 100 parts by mass of solids of the titanium-containing aqueous liquid of at least one resin selected from the group consisting of a water-soluble organic resin and a water-dispersible organic resin.

DETAILED DESCRIPTION OF THE PREFERRED EMBODIMENTS

Figure 1:
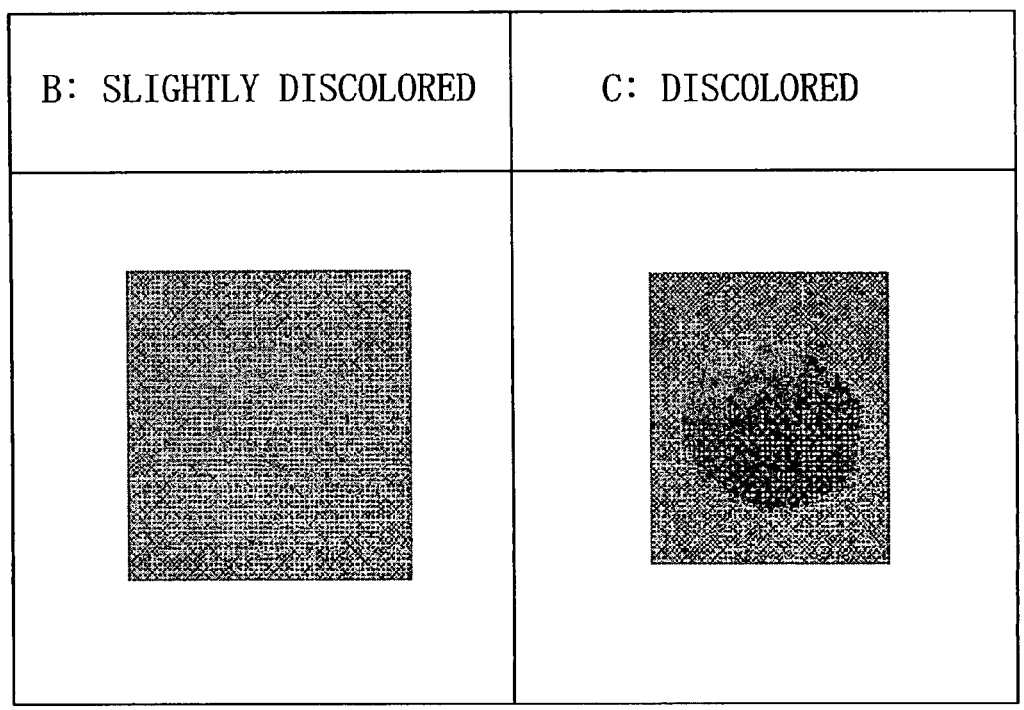
FIG. 1 is a drawing to show sample sheets (photographs) which make a standard for evaluating resistance to discoloration by water adhesion in Example 1.

Best Mode 1 for Carrying Out the Invention

The present inventors made extensive and intensive investigations regarding a film composition capable of solving the foregoing problems. As a result, it has been found that by forming a surface-treated film containing titanium, nickel, aluminum and fluorine on a surface of a zinc based plated steel sheet, a surface-treated steel sheet having excellent heat discoloration resistance, corrosion resistance, corrosion resistance of worked parts and resistance to blackening is obtained.

Examples of the zinc based plated steel sheet as a base of the surface-treated steel sheet of the invention, which can be used, include a galvanized steel sheet, a Zn—Ni alloy plated steel sheet, a Zn—Fe alloy plated steel sheet (for example, an electroplated steel sheet and an alloyed molten zinc plated steel sheet), a Zn—Cr alloy plated steel sheet, a Zn—Mn alloy steel sheet, a Zn—Co alloy plated steel sheet, a Zn—Co—Cr alloy plated steel sheet, a Zn—Cr—Ni alloy plated steel sheet, a Zn—Cr—Fe alloy plated steel sheet, a Zn—Al alloy plated steel sheet (for example, a Zn-5 mass % Al alloy plated steel sheet and a Zn-55 mass % Al alloy plated steel sheet), a Zn—Mg alloy plated steel sheet, and a Zn—Al—Mg alloy plated steel sheet; and a zinc based composite plated steel sheet obtained by dispersing a metal oxide, a polymer or the like in a plated film of such a plated steel sheet (for example, a Zn—SiO$_2$ dispersed plated steel sheet). Also, a multilayered plated steel sheet obtained by plating two or more layers of the same kind or a different kind among the foregoing platings can be used.

Also, the plated steel sheet may be one prepared by subjecting a steel sheet surface to thin coating plating with Ni or the like in advance and applying each of the foregoing various platings thereon.

As the plating method, all of methods which can be carried out among an electrolysis method (for example, electrolysis in an aqueous solution and electrolysis in a non-aqueous solvent), a hot-dip plating method and a vaporization method can be employed.

In order that in forming a surface-treated film on a surface of a plated film, deficiency or unevenness of the film may not be formed, the surface of the film can be previously subjected to a treatment such as alkaline degreasing, solvent degreasing and a surface modification treatment (for example, an alkaline surface modification treatment and an acidic surface modification treatment) as the need arises.

In order to prevent blackening under a use environment (a kind of oxidation phenomenon of plated surface) from occurring, the plated surface can be previously subjected to a surface modification treatment with an acidic or alkaline aqueous solution containing an iron-group metal ion (one or more kinds of an Ni ion, a Co ion and an Fe ion) as the need arises.

In the case where an electrogalvanized steel sheet is used as a substrate steel sheet, it is possible to add an iron-group metal ion (one or more kinds of an Ni ion, a Co ion and an Fe ion) in an electroplating bath for the purpose of preventing blackening from occurring, whereby 1 ppm by mass or more of these metals are contained in the plated film. In that case, an upper limit in the concentration of the iron-group metal in the plated film is not particularly limited.

In the surface-treated steel sheet of the invention, the surface-treated film which is formed on the surface of the zinc based plated steel sheet is a film containing prescribed amounts of titanium, nickel, aluminum and fluorine. This surface-treated film does not contain hexavalent chromium.

The foregoing titanium can be contained in the film by applying an aqueous liquid containing a titanium compound on a plated steel sheet and drying or heat treating it at a low temperature. By using such an aqueous liquid containing a titanium compound, it is possible to form a titanium oxide-containing film which is minute and excellent in adhesiveness and which has corrosion resistance and barrier properties. The heat treatment temperature after applying the aqueous liquid containing a titanium compound is preferably not higher than 200° C., and especially preferably not higher than 150° C.

A titanium deposition amount in the surface-treated film is from 0.01 to 0.5 g/m$^2$, and preferably from 0.03 to 0.3 g/m$^2$. When the titanium deposition amount is less than 0.01 g/m$^2$, it is difficult to cover minutely the entire surface of the plated steel sheet, and the resulting plated steel sheet is inferior in corrosion resistance, especially corrosion resistance of worked parts. On the other hand, when the titanium deposition amount exceeds 0.5 g/m$^2$, film separation is easy to occur at the steel sheet working due to an internal stress of the film.

The foregoing nickel is a component which is effective for enhancing resistance to blackening. By adding a nickel compound in the foregoing aqueous liquid containing a titanium compound, nickel can be contained in the film.

The content of nickel in the surface-treated film is from 0.01 to 5 parts by mass, and preferably from 0.05 to 1.5 parts by mass relative to 100 parts by mass of titanium. When the nickel content is less than 0.01 parts by mass relative to 100 parts by mass of titanium, an effect for improving blackening is not obtained sufficiently, whereas when it exceeds 5 parts by mass, though the blackening is sufficiently improved, deterioration in the corrosion resistance is remarkable.

The foregoing aluminum is a component which is effective for enhancing corrosion resistance. By adding an aluminum compound in the foregoing aqueous liquid containing a titanium compound, aluminum can be contained in the film.

The content of aluminum in the surface-treated film is from 0.1 to 25 parts by mass, and preferably from 0.5 to 10 parts by mass relative to 100 parts by mass of titanium. When the aluminum content is less than 0.1 parts by mass relative to 100 parts by mass of titanium, an enhancement in the corrosion resistance is insufficient, whereas when the addition amount is in excess exceeding 25 parts by mass, the corrosion resistance is deteriorated. It is thought that this is caused due to the matter that a film with barrier properties by titanium oxide cannot be adequately formed.

In particular, from the viewpoint of making both resistance to blackening and corrosion resistance compatible with each other, it is desirable that a mass ratio of nickel to aluminum contained in the surface-treated film is in the range of from 1/1 to 1/50, and preferably from 1/5 to 1/25.

The foregoing fluorine is a component which is effective for enhancing corrosion resistance, especially corrosion resistance of worked parts and resistance to discoloration by water adhesion and so on. By adding a fluorine-containing compound in the foregoing aqueous liquid containing a titanium compound, fluorine can be contained in the film.

The content of fluorine in the surface-treated film is from 1 to 500 parts by mass, and preferably from 10 to 400 parts by mass relative to 100 parts by mass of titanium. When the fluorine content is less than 1 part by mass relative to 100 parts by mass of titanium, an effect for enhancing the corrosion resistance is not found, whereas when it exceeds 500 parts by mass, not only an effect for enhancing the corrosion resistance is saturated, but an effect of nickel which is present for the purpose of revealing the resistance to blackening is impaired.

At least one member of zirconium, phosphorus, vanadium and the like can be further contained in the surface-treated film.

The foregoing zirconium is a component which is effective for enhancing corrosion resistance after alkaline degreasing. By adding a zirconium compound in the foregoing aqueous liquid containing a titanium compound, zirconium can be contained in the film.

It is suitable that the content of zirconium in the surface-treated film is from 2 to 1,000 parts by mass, and preferably from 30 to 1,000 parts by mass relative to 100 parts by mass of titanium. When the zirconium content is less than 2 parts by mass relative to 100 parts by mass of titanium, an effect to be brought due to the addition of zirconium is not obtained sufficiently, whereas when it is in excess exceeding 1,000 parts by mass, not only an effect for enhancing the corrosion resistance after alkaline degreasing is saturated, but an effect of titanium is impaired.

The foregoing phosphorus is a component which is effect for enhancing storage stability of the foregoing aqueous liquid containing a titanium compound. By adding a phosphorus-containing compound in the foregoing aqueous liquid containing a titanium compound, phosphorus can be contained in the film.

It is suitable that the content of phosphorus in the surface-treated film is from 1 to 300 parts by mass, and preferably from 10 to 200 parts by mass relative to 100 parts by mass of titanium. When the phosphorus content is less than 1 part by mass relative to 100 parts by mass of titanium, an effect to be brought due to the addition of phosphorus is not obtained sufficiently, whereas when it is in excess exceeding 300 parts by mass, not only an effect of phosphorus is saturated, but an effect of titanium is impaired.

Though the foregoing vanadium slightly deteriorates heat discoloration resistance, it is a component which is effective for enhancing resistance to discoloration by water adhesion. By adding a vanadium compound in the foregoing aqueous liquid containing a titanium compound, vanadium can be contained in the film.

It is suitable that the content of vanadium in the surface-treated film is from 1 to 300 parts by mass, and preferably from 5 to 300 parts by mass relative to 100 parts by mass of titanium. When the vanadium content is less than 1 part by mass relative to 100 parts by mass of titanium, an effect to be brought due to the addition of vanadium is not obtained sufficiently, whereas when it is in excess exceeding 300 parts by mass, not only an effect of vanadium is saturated, but an effect of titanium is impaired.

The analysis of the foregoing components of the surface-treated film can be, for example, carried out by the following method. First of all, titanium, zirconium, phosphorus, vanadium and nickel can be analyzed by a calibration curve method using an ICP spectral analyzer by applying concentrated sulfuric acid on a surface of a surface-treated steel sheet having a known film area to dissolve together with a plated layer; washing away it with distilled water and gathering into a Kjeldahl flask to achieve acid decomposition; and further adding concentrated hydrochloric acid to dissolve all of undissolved matters. Fluorine can be quantitatively determined from a calibration curve prepared on a fluorine compound having a known concentration by using a wavelength dispersion type fluorescent X-ray analyzer. With respect to aluminum, a difference of analysis values by ICP between an acid decomposition liquid prepared by dissolving together with the plated layer as described above and an acid decomposition liquid prepared by dissolving only the plated player is defined as an aluminum amount.

The foregoing surface-treated film of the invention can be obtained by applying an aqueous treatment liquid (surface treatment composition) on a surface of a plated steel sheet, followed by drying or heat baking. It is preferable that each of the film components is fed by the following treatment liquid component. Titanium is fed from a titanium-containing aqueous liquid (A) obtained by mixing at least one titanium compound selected from a hydrolyzable titanium compound, a low condensate of a hydrolyzable titanium compound, titanium hydroxide and a low condensate of titanium hydroxide with aqueous hydrogen peroxide.

The foregoing hydrolyzable titanium compound is a titanium compound containing a hydrolyzable group which is bound directly to titanium and forms titanium hydroxide upon reaction with moisture such as water and water vapor. The hydrolyzable titanium compound may be one in which all of groups bound to titanium are a hydrolyzable group or one in which a part of groups bound to titanium is a hydrolyzable group.

The hydrolyzable group is not particularly limited so far as it is able to form titanium hydroxide upon reaction with moisture as described above. Examples thereof include a lower alkoxyl group and a group capable of forming a salt together with titanium (for example, a halogen atom such as chlorine, a hydrogen atom, and a sulfate ion).

As the hydrolyzable titanium compound containing a lower alkoxyl group as the hydrolyzable group, a tetraalkoxytitanium represented by the general formula, $Ti(OR)_4$ (wherein Rs may be the same or different and each represents an alkyl group having from 1 to 5 carbon atoms) is especially preferable. Examples of the alkyl group having from 1 to 5 carbon atoms include a methyl group, an ethyl group, an n-propyl group, an isopropyl group, an n-butyl group, an isobutyl group, a sec-butyl group, and a tert-butyl group.

Representative examples of the hydrolyzable titanium compound containing, as the hydrolyzable group, a group capable of forming a salt together with titanium include titanium chloride and titanium sulfate.

The low condensate of a hydrolyzable titanium compound is a low condensate of the foregoing hydrolyzable titanium compounds each other. This low condensate may be one in which all of groups bound to titanium are a hydrolyzable group or one in which a part of groups bound to titanium is a hydrolyzable group.

With respect to the hydrolyzable titanium compound in which the hydrolyzable group is a group capable of forming a salt together with titanium (for example, titanium chloride and titanium sulfate), orthotitanic acid (titanium hydroxide gel) obtainable from reaction of an aqueous solution of that hydrolyzable titanium compound and an alkaline solution such as ammonia and sodium hydroxide can also be used as the low condensate.

As the low condensate of a hydrolyzable titanium compound and the low condensate of titanium hydroxide, a compound having a degree of condensation of from 2 to 30 can be used, and a compound having a degree of condensation of from 2 to 10 is especially preferably used. When the degree of condensation exceeds 30, a white precipitate is formed in mixing with hydrogen peroxide, whereby a stable titanium-containing aqueous liquid is not obtainable.

The hydrolyzable titanium compound, the low condensate of a hydrolyzable titanium compound, the titanium hydroxide and the low condensate of titanium hydroxide as described previously can be used singly or in admixture of two or more kinds thereof. Above all, a tetraalkoxytitanium which is a hydrolyzable titanium compound represented by the foregoing general formula is especially preferable.

As the titanium-containing aqueous liquid (A), conventionally known aqueous liquids can be used without particular limitations so far as they are a titanium-containing aqueous liquid obtained by mixing the foregoing titanium compound with aqueous hydrogen peroxide. Specific examples include those described below.

(i) A titanyl ion hydrogen peroxide complex or titanic acid (peroxo titanium hydrate) aqueous solution obtainable by adding aqueous hydrogen peroxide in a sol or gel of hydrous titanium oxide (see JP-A-63-35419 and JP-A-1-224220).

(ii) A titania film forming liquid obtainable through synthesis by acting aqueous hydrogen peroxide on a titanium hydroxide gel manufactured from an aqueous solution of titanium chloride or titanium sulfate and a basic solution (see JP-A-9-71418 and JP-A-10-67516).

In the case of obtaining this titania film forming liquid, an aqueous solution of titanium chloride or titanium sulfate is allowed to react with an alkaline solution such as ammonia and sodium hydroxide, thereby precipitating a titanium hydroxide gel called as orthotitanic acid. Next, separation of the titanium hydroxide gel by decantation and water washing are repeated; aqueous hydrogen peroxide is further added; and excessive hydrogen peroxide is decomposed and removed, whereby a yellow, transparent, viscous liquid can be obtained.

The foregoing precipitated orthotitanic acid is in a gel state that it is converted into a high molecular weight compound due to polymerization of OHs each other or hydrogen bonding and cannot be used as a titanium-containing aqueous liquid as it is. When aqueous hydrogen peroxide is added in this gel, a part of OHs becomes in a peroxidized state, whereby the orthotitanic acid is dissolved as a peroxotitanate ion, or a polymer chain is cleaved to become in a low molecular weight state, whereby the orthotitanic acid becomes in a sol state of a sort; excessive hydrogen peroxide is decomposed into water and oxygen; and the resultant is able to be used as a titanium-containing aqueous liquid for forming an inorganic film.

This sol contains only an oxygen atom and a hydrogen atom other than titanium atom. Accordingly, in the case where the gel is changed to titanium oxide by drying or baking, since only water and oxygen are generated, the removal of a carbon component and a halogen component necessary for a sol-gel method or heat decomposition of a sulfate, etc. is not necessary, and a titanium oxide film with a relatively high density can be formed even at a low temperature.

(iii) A titanium oxide forming solution obtained by standing or heating a solution obtained by adding hydrogen peroxide to an aqueous solution of an inorganic titanium compound such as titanium chloride and titanium sulfate to form a peroxo titanium hydrate and then adding a basic substance to form a precipitate of a peroxo titanium hydrate polymer, subsequently removing dissolved components other than water as derived from at least the titanium-containing raw material solution and then acting hydrogen peroxide thereon (see JP-A-2000-247638 and JP-A-2000-247639).

The titanium-containing aqueous liquid (A) using, as a titanium compound, a hydrolyzable titanium compound and/or a low condensate thereof (hereinafter referred to as "hydrolyzable titanium compound $\underline{a}$" for the sake of convenience of the description) can be obtained by allowing the hydrolyzable titanium compound $\underline{a}$ to react with aqueous hydrogen peroxide at a reaction temperature of from 1 to 70° C. for from about 10 minutes to 20 hours.

With respect to the titanium-containing aqueous solution (A) using this hydrolyzable titanium compound $\underline{a}$, it is thought that by allowing the hydrolyzable titanium compound $\underline{a}$ to react with aqueous hydrogen peroxide, the hydrolyzable titanium compound $\underline{a}$ is hydrolyzed to form a hydroxyl group-containing titanium compound, with which is then coordinated hydrogen peroxide. The titanium-containing aqueous solution (A) is obtained due to the matter that this hydrolysis reaction and the coordination with hydrogen peroxide occur substantially at the same time, and a chelate liquid which is extremely high in stability in a room temperature region and durable against long-term storage is formed. A titanium hydroxide gel which is used in a conventional manufacturing method partially forms a three-dimensional structure due to Ti—O—Ti bonding, and this gel is essentially different in composition and stability from the titanium-containing aqueous liquid (A) obtained by the reaction of this gel with aqueous hydrogen peroxide.

When the titanium-containing aqueous liquid (A) using the hydrolyzable titanium compound $\underline{a}$ is subjected to heat treatment or autoclave treatment at 80° C. or higher, a titanium oxide dispersion containing an ultrafine particle of crystallized titanium oxide is obtained. When the foregoing heat treatment or autoclave treatment is performed at lower than 80° C., the crystallization of titanium oxide does not proceed sufficiently. It is desirable that the thus manufactured titanium oxide dispersion has an average particle size of titanium oxide ultrafine particle of not more than 10 nm, and preferably from about 1 to 6 nm. What the average particle size of the titanium oxide ultrafine particle is more than 10 nm is not preferable because film forming properties are lowered (in the case of forming a film after applying and drying, breakage is generated at a film thickness of 1 μm or more). The appearance of this titanium oxide dispersion is translucent. Such a titanium oxide dispersion can also be used as the titanium-containing aqueous liquid (A).

By applying an aqueous treatment liquid containing the titanium-containing aqueous liquid (A) using the hydrolyzable titanium compound a (the aqueous treatment liquid is also called as "surface treatment composition") on a surface of a plated steel sheet and drying (for example, heat drying at a low temperature), it is possible to form a minute titanium oxide-containing film (surface-treated film) which has excellent adhesion properties by itself.

The heating temperature after applying the aqueous treatment liquid is preferably, for example, not higher than 200° C., and especially preferably not higher than 150° C. By heat drying at such a temperature, it is possible to form an amorphous titanium oxide-containing film containing a hydroxyl group a little.

In the case where the titanium oxide dispersion obtained through the foregoing heat treatment or autoclave treatment at 80° C. or higher is used as the titanium-containing aqueous liquid (A), since a crystalline titanium oxide-containing film can be formed only by applying the aqueous treatment liquid, it is useful as a coating material for materials which cannot be heat treated.

A titanium-containing aqueous liquid (A1) obtained by allowing the hydrolyzable titanium compound a to react with aqueous hydrogen peroxide in the presence of a titanium oxide sol can also be used as the titanium-containing aqueous liquid (A).

The foregoing titanium oxide sol is a sol in which an amorphous titania fine particle and/or an anatase type titania fine particle is dispersed in water (an aqueous organic solvent, for example, alcohols and alcohol ethers may be added as the need arises). As this titanium oxide sol, those which are conventionally known can be used, and for example, an amorphous titanyl sol obtained by dispersing a titanium oxide agglomerate such as (i) titanium agglomerates obtained by hydrolysis of a titanium-containing solution such as titanium sulfate and titanyl sulfate, (ii) titanium oxide agglomerates obtained by hydrolysis of an organotitanium compound such as titanium alkoxides and (iii) titanium oxide agglomerates obtained by hydrolysis or neutralization of a titanium halide solution such as titanium tetrachloride in water, or a sol obtained by baking the foregoing titanium oxide agglomerate to form an anatase type fine particle, which is then dispersed in water can be used.

In baking the foregoing amorphous titania, when baking is performed at a temperature of at least the crystallization temperature of anatase or higher, for example, a temperature of 400° C. to 500° C. or higher, the amorphous titania can be converted into anatase type titania. Examples of this aqueous sol of titanium oxide include TKS-201 (a trade name of Tayca Corporation, an anatase type crystal form, average particle size: 6 nm), TA-15 (a trade name of Nissan Chemical Industries, Ltd., an anatase type crystal form), and STS-11 (a trade name of Ishihara Sangyo Kaisha, Ltd., an anatase type crystal form).

In the titanium-containing aqueous liquid (A1), it is suitable that a mass ratio of the foregoing titanium sol x to a hydrogen peroxide reaction product y (a reaction product between the hydrolyzable titanium compound a and aqueous hydrogen peroxide) is in the range of from 1/99 to 99/1, and preferably from about 10/90 to 90/10. When the mass ratio x/y is less than 1/99, an effect to be brought due to the addition of the titanium oxide sol is not obtained sufficiently from the standpoints of stability, photoreactivity and the like, whereas when it exceeds 99/1, film forming properties are inferior, and therefore, such is not preferable.

The titanium-containing aqueous liquid (A1) can be obtained by allowing the hydrolyzable titanium compound a to react with aqueous hydrogen peroxide in the presence of the titanium oxide sol at a reaction temperature of from 1 to 70° C. for from about 10 minutes to 20 hours.

The formation behavior of the titanium-containing aqueous liquid (A1) and characteristics thereof are the same as those in the titanium-containing aqueous liquid (A) using the hydrolyzable titanium compound a as described previously. In particular, by using the titanium oxide sol, a condensation reaction partially occurs at the synthesis, thereby suppressing thickening. As a reason for this, it is thought that the condensation reaction product is adsorbed on a surface of the titanium oxide sol, whereby the conversion into a high molecular weight compound in a solution state is suppressed.

When the titanium-containing aqueous liquid (A1) is subjected to heat treatment or autoclave treatment at 80° C. or higher, a titanium oxide dispersion containing a crystallized titanium oxide ultrafine particle is obtained. The temperature condition for obtaining this titanium oxide dispersion, the particle size of the crystallized titanium oxide ultrafine particle, the appearance of the dispersion, and the like are also the same as those in the titanium-containing aqueous liquid (A) using the hydrolyzable titanium compound a as described previously. Such a titanium oxide dispersion can also be used as the titanium-containing aqueous liquid (A1).

Likewise the titanium-containing aqueous liquid (A) using the hydrolyzable titanium compound a as described previously, by applying an aqueous treatment liquid containing the titanium-containing aqueous liquid (A1) (surface treatment composition) on a surface of a plated steel sheet and drying (for example, heat drying at a low temperature), it is possible to form a minute titanium oxide-containing film (surface-treated film) which has excellent adhesion properties by itself.

The heating temperature after applying the aqueous treatment liquid is preferably, for example, not higher than 200° C., and especially preferably not higher than 150° C. By heat drying at such a temperature, it is possible to form an anatase type titanium oxide-containing film containing a hydroxyl group a little.

With respect to the foregoing titanium-containing aqueous liquid (A), the titanium-containing aqueous liquid (A) and the titanium-containing aqueous liquid (A1) each using the hydrolyzable titanium compound a have excellent performance in storage stability, corrosion resistance and the like, and therefore, in the invention, it is especially preferred to use these aqueous liquids.

It is desirable that a blending proportion of aqueous hydrogen peroxide to the at least one titanium compound selected from a hydrolyzable titanium compound, a low condensate of a hydrolyzable titanium compound, titanium hydroxide and a low condensate of titanium hydroxide is from 1 to 100 parts by mass, and preferably from 1 to 20 parts by mass as reduced into hydrogen peroxide relative to 10 parts by mass of the titanium compound. When the blending proportion of aqueous hydrogen peroxide is less than 0.1 parts by mass as reduced into hydrogen peroxide, the formation of a chelate is not sufficient so that a cloudy precipitate is formed. On the other hand, when it exceeds 100 parts by mass, unreacted hydrogen peroxide is easy to remain and dangerous active oxygen is released during the storage, and therefore, such is not preferable.

Though a concentration of hydrogen peroxide in aqueous hydrogen peroxide is not particularly limited, it is preferably from about 3 to 30% by mass because a solids concentration of a formed liquid related to easiness of handling and coating workability is appropriate.

Other sols or pigments can also be added and dispersed in the titanium-containing aqueous liquid (A) as the need arises. Examples of additives include commercially available titanium sols and titanium oxide powders, mica, talc, silica, baryta and clays. One or more kinds of these additives can be added.

The content of the titanium-containing aqueous liquid (A) in the aqueous treatment liquid (surface treatment composition) is from 1 to 100 g/L, and preferably from 5 to 50 g/L as solids from the standpoints of stability of the treatment liquid and the like.

Nickel can be contained in the film by, for example, adding one or two or more kinds of nickel acetate, nickel nitrate, nickel sulfate, and the like in the aqueous treatment liquid. Of these, nickel acetate is suitable from the standpoint of resistance to blackening.

Aluminum can be contained in the film by, for example, adding one or two or more kinds of aluminum nitrate, aluminum acetate, aluminum sulfate, aluminum oxide, aluminum acetyl acetonate, an aluminate, and the like in the aqueous treatment liquid.

Fluorine can be contained in the film by, for example, adding one or two or more kinds of ammonium zirconium fluoride, potassium zirconium fluoride, zirconium hydrofluoride, ammonium titanium fluoride, hydrofluoric acid, ammonium hydrofluoride, and the like in the aqueous treatment liquid. Of these, one or more kinds of ammonium zirconium fluoride and zirconium hydrofluoride are suitable. That is, ammonium zirconium fluoride is preferable from the standpoints of corrosion resistance after alkaline degreasing and resistance to discoloration by water adhesion; and zirconium hydrofluoride is preferable from the standpoint of corrosion resistance after alkaline degreasing.

It is preferable that phosphorus is contained in the film by adding an organic phosphoric acid compound in the aqueous treatment liquid. Suitable examples of the organic phosphoric acid compound include hydroxyl group-containing organic phosphorous acids such as 1-hydroxymethane-1,1-diphosphoric acid, 1-hydroxyethane-1,1-diphosphonic acid, and 1-hydroxypropane-1,1-diphosphonic acid; carboxyl group-containing organic phosphorous acids such as 2-hydroxy-phosphonoacetic acid and 2-phosphono-butane-1,2,4-tricarboxylic acid; and salts thereof. One or two or more kinds of these compounds can be used. Of these, 1-hydroxyethane-1,1-diphosphonic acid is especially preferable because its effect is large.

Vanadium can be contained in the film by, for example, adding one or two or more members of lithium m-vanadate, potassium m-vanadate, sodium m-vanadate, ammonium m-vanadate, vanadic anhydride, and the like in the aqueous treatment liquid. Of these, ammonium m-vanadate is preferable from the standpoints of resistance to discoloration by water adhesion and the like.

Zirconium can be contained in the film by, for example, adding one or two or more members of sodium, potassium, lithium and ammonium salts of zirconium carbonate in the aqueous treatment liquid. Of these, ammonium zirconium carbonate is preferable from the standpoints of resistance to discoloration by water adhesion and the like.

Furthermore, an organic resin component may be contained in the surface-treated film of the invention for the purpose of enhancing corrosion resistance. In order that the organic resin component may be contained in the film, a water-soluble organic resin and/or a water-dispersible organic resin may be added in the aqueous treatment liquid.

The foregoing water-soluble organic resin and/or water-dispersible organic resin is an organic resin capable of being dissolved or dispersed in water. As a method for making the organic resin soluble in water or dispersible in water, conventionally known methods can be applied. Specific examples of the organic resin which can be used include ones containing a functional group capable of being made soluble in water or dispersible in water by itself (for example, a hydroxyl group, a polyoxyalkylene group, a carboxyl group, an amino (imino) group, a sulfide group, and a phosphine group); ones in which in the case of an acidic resin (for example, carboxyl group-containing resins), a part or all of these functional groups have been optionally neutralized with an amine compound (for example, ethanolamine and triethylamine), ammonia water or an alkali metal hydroxide (for example, lithium hydroxide, sodium hydroxide, and potassium hydroxide); and ones in which in the case of a basic resin (for example, amino group-containing resins), a part or all of these functional groups have been optionally neutralized with a fatty acid (for example, acetic acid and lactic acid) or a mineral acid (for example, phosphoric acid).

Examples of the water-soluble or water-dispersible organic resin include epoxy based resins, phenol based resins, acrylic resins, urethane based resins, olefin-carboxylic acid based resins, nylon based resins, polyoxyalkylene chain-containing resins, polyvinyl alcohol, polyglycerin, carboxymethyl cellulose, hydroxymethyl cellulose, and hydroxyethyl cellulose. One or two or more kinds of these resins can be used.

The surface-treated film (or film forming aqueous treatment liquid) can further contain, for example, a silane coupling agent, a resin fine particle, a heavy metal compound other than the components of the invention, a thickener, a surfactant, a wettability imparting agent (for example, polyethylene waxes, fluorocarbon waxes, and carnauba wax), a rust proofing agent, a coloring pigment, an extender pigment, a rustproof pigment, and a dye as the need arises. A film thickness of the surface-treated film is from 0.05 to 1.0 μm, preferably from 0.10 to 0.70 μm, and more preferably from 0.15 to 0.50 μm. When the film thickness is less than 0.05 μm, the surface-treated film is inferior in corrosion resistance, corrosion resistance of worked parts and corrosion resistance after alkaline degreasing, whereas when it exceeds 1.0 μm, the surface-treated film is inferior in heat discoloration resistance, corrosion resistance, corrosion resistance of worked parts, corrosion resistance after alkaline degreasing and resistance to discoloration by water adhesion.

The surface-treated steel sheet of the invention may be manufactured by applying the foregoing aqueous treatment liquid on a surface of a zinc based plated steel sheet, followed by drying or heat baking.

With respect to the application method of the aqueous treatment liquid, for example, a combination of spraying and roll squeezing and roll coater application can be arbitrarily employed; and with respect to a drying system after application, for example, a hot air drying system, a dielectric heating system, and an electric furnace system can be arbitrarily employed.

A drying temperature (steel sheet temperature) of the applied aqueous treatment liquid is from about 60 to 200° C. When the drying temperature is lower than 60° C., the film formation is insufficient so that the corrosion resistance and the like inferior. On the other hand, even when drying is performed at a sheet temperature exceeding 200° C., an effect for enhancing the corrosion resistance adaptive with the drying temperature is not obtained, and there is a possibility that the corrosion resistance is rather lowered. It is thought that this is caused due to the matter that a crack is formed in the film by heat.

EXAMPLE 1

A titanium-containing aqueous liquid (A) and components (B) to (G) used in a film forming aqueous treatment liquid (surface treatment composition) are shown below.

[Preparation of Titanium-containing Aqueous Liquid (A)]

PREPARATION EXAMPLE 1

Titanium-containing Aqueous Liquid T1

To a solution prepared by making 5 cc of a 60% by mass solution of titanium tetrachloride to 500 cc with distilled water, ammonia water (1/9) was added dropwise, thereby precipitating titanium hydroxide. After washing with distilled water, 10 cc of a 30% by mass solution of aqueous hydrogen peroxide was added, and the mixture was stirred to obtain a yellow, translucent, viscous titanium-containing aqueous liquid T1 containing titanium.

PREPARATION EXAMPLE 2

Titanium-containing Aqueous Liquid T2

To a mixture of 10 parts by mass of 30% by mass aqueous hydrogen peroxide and 100 parts by mass of deionized water, a mixture of 10 parts by mass of tetraisopropoxy titanium and 10 parts by mass of isopropanol was added dropwise at 20° C. over one hour while stirring. Thereafter, the resulting mixture was aged at 25° C. for 2 hours to obtain a yellow, transparent, slightly viscous titanium-containing aqueous liquid T2.

[Nickel Compound (B)]
   B1: Nickel acetate
   B2: Nickel nitrate

[Aluminum Compound (C)]
   C1: Aluminum nitrate
   C2: Aluminum acetate

[Fluorine-containing compound (D)]
   D1: Ammonium zirconium fluoride
   D2: Hydrofluoric acid

[Organic Phosphoric Acid Compound (E)]
   E1: 1-Hydroxyethane-1,1-diphosphonic acid

[Vanadic Acid Compound (F)]
   F1: Ammonium m-vanadate
   F2: Sodium m-vanadate

[Zirconium Carbonate Compound (G)]
   G1: Ammonium zirconium carbonate
   G2: Sodium zirconium carbonate Each of plated steel sheets as shown in Table 1 was used as a base steel sheet of a surface-treated steel sheet.

An aqueous treatment liquid (surface treatment composition) in which the foregoing titanium-containing aqueous liquid (A) and components (B) to (G) were properly blended was applied on a surface of the plated steel sheet and dried such that three seconds thereafter, a maximum ultimate sheet temperature reached 100° C., thereby preparing a test specimen. With respect to these test specimens, the film components were analyzed and the performance (namely, heat discoloration resistance, corrosion resistance, corrosion resistance of worked parts, corrosion resistance after alkaline degreasing, resistance to blackening and resistance to discoloration by water adhesion) was evaluated in the following methods.

The obtained results are shown in Tables 2 to 5 along with the film composition of each test specimen and the addition components of the aqueous treatment liquid.

[Film Analysis Method]

The analysis of components of the surface-treated film was performed in the following manner.

Titanium, zirconium, phosphorus, vanadium and nickel were analyzed by a calibration curve method using an ICP spectral analyzer by applying concentrated sulfuric acid on a surface of a surface-treated steel sheet having a known film area to dissolve together with a plated layer; washing away it with distilled water and gathering into a Kjeldahl flask to achieve acid decomposition; and further adding concentrated hydrochloric acid to dissolve all of undissolved matters. Fluorine was quantitatively determined from a calibration curve prepared on a fluorine compound having a known concentration by using a wavelength dispersion type fluorescent X-ray analyzer. With respect to aluminum, a difference of analysis values by ICP between an acid decomposition liquid prepared by dissolving together with the plated layer as described above and an acid decomposition liquid prepared by dissolving only the plated player was defined as an aluminum amount.

[Performance Evaluation Method]
(1) Heat Discoloration Resistance:
   A test specimen was heated in an infrared image furnace at a sheet temperature of 500° C. for 30 seconds, and after keeping for 30 seconds, when the test specimen was allowed to cool spontaneously to room temperature, the surface appearance was visually observed. Criteria of the evaluation are as follows.
   A: Not discolored
   B: Slightly discolored
   C: Discolored pale yellow
   D: Discolored yellow to brown
(2) Corrosion Resistance:
   A test specimen (50 mm×150 mm) in which end parts and back surface thereof were sealed was provided for a salt water spray test in conformity with a neutral salt water spray test method of JIS Z2371-2000, and a test period at which an area rate of white rusting was 5% was measured. Criteria of the evaluation are as follows.
   A: 120 hours or more
   B: 96 hours or more and less than 120 hours
   C: 48 hours or more and less than 96 hours
   D: Less than 48 hours
(3) Corrosion Resistance of Worked Parts:
   A test specimen (50 mm×150 mm) in which end parts and back surface thereof were sealed was bent by 180° at 2.5 mmR while positioning a test surface outwardly and provided for a salt water spray test in conformity with a neutral salt water spray test method of JIS Z2371-2000, and a test period at which a rate of white rusting was 5% in a length of 50 mm in the width direction of the bent chip part was measured. Criteria of the evaluation are as follows.
   A: 96 hours or more
   B: 48 hours or more and less than 96 hours
   C: 24 hours or more and less than 48 hours
   D: Less than 24 hours.
(4) Corrosion Resistance after Alkaline Degreasing:
   An alkaline degreasing agent "CLN-364S" (manufactured by Nihon Parkerizing Co., Ltd.) was dissolved in pure water in a concentration of 2% by mass, heated at 60° C. and sprayed on a test specimen (50 mm×150 mm) for 2 minutes; after sealing end parts and back surface of the test specimen, the resulting test specimen was provided for a salt water spray test in conformity with a neutral salt water spray test method of JIS Z2371-2000; and a test period at which an area rate of white rusting was 5% was measured. Criteria of the evaluation are as follows.
   A: 96 hours or more
   B: 48 hours or more and less than 96 hours
   C: 24 hours or more and less than 48 hours
   D: Less than 24 hours.
(5) Resistance to Blackening:
   A test specimen was allowed to stand in a thermostat controlled in an atmosphere at a temperature of 80° C. and a relative humidity of 95% for 24 hours, and a change of whiteness degree (L value) [ΔL=(L value after the test)-(L value before the test)] was determined. Criteria of the evaluation are as follows.

A: ΔL≧−5.0
B: −5.0>ΔL≧−10.0
C: −10.0>ΔL (6) Resistance to Discoloration by Water Adhesion:

Ten droplets of ion-exchanged water were added dropwise on substantially the same spot of a test specimen (50 mm×150 mm); the test specimen was dried in an oven heated at 100° C. for 10 minutes; and the appearance immediately after drying was visually judged. Criteria of the evaluation are as follows. Photographs of sample sheets for standards of "B" and "C" are shown in FIG. 1.

A: Not discolored
B: Slightly discolored
C: Discolored

TABLE 1

| No. | Kind | Sheet thickness (mm) | Plating deposition amount per surface (g/m$^2$) |
|---|---|---|---|
| 1 | Electrogalvanized steel sheet | 0.6 | 20 |
| 2 | Molten zinc plated steel sheet | 0.6 | 60 |
| 3 | Alloyed molten zinc plated steel sheet (Fe: 10 mass %) | 0.6 | 45 |
| 4 | Molten Zn—Al alloy plated steel sheet (Al: 55 mass %) | 0.6 | 90 |
| 5 | Molten Zn-5 mass % Al-0.5 mass % Mg alloy plated steel sheet | 0.6 | 90 |

In Tables 2 and 4, *1 to *8 each represents as follows.
*1: Plated steel sheets Nos. 1 to 5 as described in Table 1
*2: Titanium-containing aqueous liquids T1 and T2 as described in the present specification
*3: Nickel compounds B1 and B2 as described in the present specification
*4: Aluminum compounds C1 and C2 as described in the present specification
*5: Fluorine-containing compounds D1 and D2 as described in the present specification
*6: Organic phosphoric acid compound E1 as described in the present specification
*7: Vanadic acid compounds F1 and F2 as described in the present specification
*8: Zirconium carbonate compounds G1 and G2 as described in the present specification

TABLE 2

| | | Addition components in treatment liquid | | | | | | |
|---|---|---|---|---|---|---|---|---|
| No. | Plated steel sheet *1 | Titanium-containing aqueous liquid (A) *2 | Nickel compound (B) *3 | Aluminum compound (C) *4 | Fluorine-containing compound (D) *5 | Organic phosphoric acid compound (E) *6 | Vanadic acid compound (F) *7 | Zirconium carbonate compound (G) *8 |
| Invention 1 | 2 | T1 | B1 | C1 | D1 | — | — | — |
| Invention 2 | 2 | T2 | B1 | C1 | D1 | — | — | — |
| Invention 3 | 2 | T2 | B1 | C1 | D1 | — | — | — |
| Invention 4 | 2 | T2 | B1 | C1 | D1 | — | — | — |
| Invention 5 | 2 | T2 | B1 | C1 | D1 | — | — | — |
| Invention 6 | 2 | T2 | B1 | C1 | D1 | — | — | — |
| Invention 7 | 2 | T2 | B1 | C1 | D1 | — | — | — |
| Invention 8 | 2 | T2 | B2 | C1 | D1 | — | — | — |
| Invention 9 | 2 | T2 | B1 + B2 | C1 | D1 | — | — | — |
| Invention 10 | 1 | T2 | B1 | C2 | D1 | — | — | — |
| Invention 11 | 3 | T2 | B1 | C1 + C2 | D1 | — | — | — |
| Invention 12 | 4 | T2 | B1 | C1 | D2 | — | — | — |
| Invention 13 | 5 | T2 | B1 | C1 | D2 | — | — | — |
| Invention 14 | 2 | T2 | B1 | C1 | D1 | — | — | — |
| Invention 15 | 2 | T2 | B1 | C1 | D1 | — | — | — |
| Invention 16 | 2 | T2 | B1 | C1 | D1 | E1 | — | — |

TABLE 3

| | Film components | | | | | | | |
|---|---|---|---|---|---|---|---|---|
| | Titanium deposition amount | Parts by mass relative to 100 parts by mass of titanium | | | | | | Film thickness |
| No. | (g/m$^2$) | Nickel | Aluminum | Fluorine | Phosphorus | Vanadium | Zirconium | (μm) |
| Invention 1 | 0.11 | 0.02 | 5.8 | 80 | 0 | 0 | 95 | 0.35 |
| Invention 2 | 0.10 | 0.11 | 4.5 | 75 | 0 | 0 | 88 | 0.38 |
| Invention 3 | 0.08 | 3.88 | 17 | 72 | 0 | 0 | 102 | 0.32 |
| Invention 4 | 0.24 | 0.01 | 4.8 | 5 | 0 | 0 | 9 | 0.40 |
| Invention 5 | 0.15 | 0.05 | 4.2 | 42 | 0 | 0 | 50 | 0.30 |
| Invention 6 | 0.08 | 0.32 | 4.5 | 105 | 0 | 0 | 134 | 0.36 |

TABLE 3-continued

| | | | | | | | | |
|---|---|---|---|---|---|---|---|---|
| Invention 7 | 0.03 | 4.43 | 11 | 380 | 0 | 0 | 486 | 0.38 |
| Invention 8 | 0.10 | 0.11 | 4.3 | 80 | 0 | 0 | 98 | 0.33 |
| Invention 9 | 0.10 | 0.13 | 4.5 | 62 | 0 | 0 | 87 | 0.35 |
| Invention 10 | 0.13 | 0.15 | 4.0 | 60 | 0 | 0 | 65 | 0.35 |
| Invention 11 | 0.11 | 0.11 | 3.7 | 102 | 0 | 0 | 140 | 0.32 |
| Invention 12 | 0.13 | 0.33 | 5.1 | 15 | 0 | 0 | 0 | 0.38 |
| Invention 13 | 0.09 | 4.43 | 4.2 | 62 | 0 | 0 | 0 | 0.25 |
| Invention 14 | 0.03 | 0.10 | 6.5 | 80 | 0 | 0 | 108 | 0.09 |
| Invention 15 | 041 | 0.15 | 2.2 | 95 | 0 | 0 | 80 | 0.81 |
| Invention 16 | 0.07 | 0.11 | 3.5 | 65 | 64 | 0 | 89 | 0.29 |

| | Characteristics | | | | | |
|---|---|---|---|---|---|---|
| No. | Heat discoloration resistance | Corrosion resistance | Corrosion resistance of worked parts | Corrosion resistance after alkaline degreasing | Resistance to blackening | Resistance to discoloration by water adhesion |
| Invention 1 | A | A | A | A | A | B |
| Invention 2 | A | A | A | A | A | B |
| Invention 3 | A | B | A | B | A | B |
| Invention 4 | A | A | B | B | A | B |
| Invention 5 | A | A | A | A | A | B |
| Invention 6 | A | A | A | A | A | B |
| Invention 7 | A | A | A | A | A | B |
| Invention 8 | A | A | A | A | A | B |
| Invention 9 | A | A | A | A | A | B |
| Invention 10 | A | A | A | A | A | B |
| Invention 11 | A | A | A | A | A | B |
| Invention 12 | A | A | A | A | A | B |
| Invention 13 | A | B | A | B | A | B |
| Invention 14 | A | A | A | A | A | B |
| Invention 15 | A | A | A | A | A | B |
| Invention 16 | A | A | A | A | A | B |

TABLE 4

| | | Addition components in treatment liquid | | | | | | |
|---|---|---|---|---|---|---|---|---|
| No. | Plated steel sheet *1 | Titanium-containing aqueous liquid (A) *2 | Nickel compound (B) *3 | Aluminum compound (C) *4 | Fluorine-containing compound (D) *5 | Organic phosphoric acid compound (E) *6 | Vanadic acid compound (F) *7 | Zirconium carbonate compound (G) *8 |
| Invention 17 | 2 | T2 | B1 | C1 | D1 | E1 | — | — |
| Invention 18 | 2 | T2 | B1 | C1 | D1 | — | F1 | — |
| Invention 19 | 2 | T2 | B1 | C1 | D1 | — | F1 | — |
| Invention 20 | 2 | T2 | B1 | C1 | D1 | E1 | F1 | — |
| Invention 21 | 2 | T2 | B1 | C1 | D1 | E1 | F2 | — |
| Invention 22 | 2 | T2 | B1 | C1 | D1 | — | — | G1 |
| Invention 23 | 2 | T2 | B1 | C1 | D1 | — | — | G1 |
| Invention 24 | 2 | T2 | B1 | C1 | D1 | E1 | F1 | G1 |
| Invention 25 | 2 | T2 | B1 | C1 | D1 | E1 | F1 | G2 |
| Comparison 1 | 2 | T2 | — | C1 | D1 | — | — | — |
| Comparison 2 | 2 | T2 | B1 | C1 | D1 | — | — | — |
| Comparison 3 | 2 | T2 | B1 | — | D1 | — | — | — |
| Comparison 4 | 2 | T2 | B1 | C1 | D1 | — | — | — |
| Comparison 5 | 2 | T2 | B1 | C1 | — | — | — | — |
| Comparison 6 | 2 | T2 | B1 | C1 | D1 | — | — | — |
| Comparison 7 | 2 | T2 | B1 | C1 | D1 | — | — | — |
| Comparison 8 | 2 | — | — | — | D1 | — | F1 | G1 |
| Comparison 9 | 2 | T2 | B1 | C1 | D1 | — | F1 | G1 |
| Comparison 10 | 2 | T2 | B1 | C1 | D1 | E1 | F1 | G1 |

TABLE 5

| No. | Titanium deposition amount (g/m²) | Film components Parts by mass relative to 100 parts by mass of titanium | | | | | | Film thickness (μm) |
|---|---|---|---|---|---|---|---|---|
| | | Nickel | Aluminum | Fluorine | Phosphorus | Vanadium | Zirconium | |
| Invention 17 | 0.05 | 0.11 | 2.8 | 52 | 185 | 0 | 68 | 0.25 |
| Invention 18 | 0.06 | 0.11 | 1.8 | 66 | 0 | 105 | 82 | 0.28 |
| Invention 19 | 0.05 | 0.11 | 2.6 | 93 | 0 | 254 | 106 | 0.32 |
| Invention 20 | 0.07 | 0.11 | 1.5 | 69 | 75 | 38 | 0 | 0.40 |
| Invention 21 | 0.05 | 0.11 | 1.8 | 112 | 80 | 82 | 0 | 0.38 |
| Invention 22 | 0.05 | 0.11 | 2.1 | 68 | 0 | 0 | 87 | 0.20 |
| Invention 23 | 0.05 | 0.11 | 4.0 | 91 | 0 | 0 | 174 | 0.18 |
| Invention 24 | 0.34 | 0.11 | 1.5 | 45 | 102 | 15 | 87 | 0.78 |
| Invention 25 | 0.18 | 0.11 | 1.9 | 75 | 89 | 145 | 97 | 0.80 |
| Comparison 1 | 0.11 | 0 | 4.1 | 86 | 0 | 0 | 0 | 0.31 |
| Comparison 2 | 0.11 | 8.31 | 4.2 | 76 | 0 | 0 | 0 | 0.35 |
| Comparison 3 | 0.12 | 0.11 | 0 | 84 | 0 | 0 | 0 | 0.38 |
| Comparison 4 | 0.08 | 0.11 | 28 | 69 | 0 | 0 | 0 | 0.36 |
| Comparison 5 | 0.25 | 0.11 | 5.6 | 0 | 0 | 0 | 0 | 0.40 |
| Comparison 6 | 0.03 | 4.43 | 8.1 | 546 | 0 | 0 | 0 | 0.25 |
| Comparison 7 | 0.67 | 0.11 | 4.8 | 80 | 0 | 0 | 0 | 1.25 |
| Comparison 8* | 0 | 0 | 0 | (0.05) | 0 | (0.05) | (0.12) | 0.15 |
| Comparison 9 | 0.01 | 0.11 | 0.5 | 20 | 0 | 82 | 82 | 0.03 |
| Comparison 10 | 0.50 | 0.11 | 4.2 | 380 | 185 | 254 | 488 | 1.10 |

| No. | Characteristics | | | | | |
|---|---|---|---|---|---|---|
| | Heat discoloration resistance | Corrosion resistance | Corrosion resistance of worked parts | Corrosion resistance after alkaline degreasing | Resistance to blackening | Resistance to discoloration by water adhesion |
| Invention 17 | A | A | A | A | A | B |
| Invention 18 | A | A | A | A | A | A |
| Invention 19 | A | A | A | A | A | A |
| Invention 20 | A | A | A | A | A | A |
| Invention 21 | A | A | A | A | A | A |
| Invention 22 | B | A | A | A | A | B |
| Invention 23 | B | A | A | A | A | B |
| Invention 24 | A | A | A | A | A | B |
| Invention 25 | A | A | A | A | A | A |
| Comparison 1 | B | B | B | B | C | B |
| Comparison 2 | B | D | D | D | A | B |
| Comparison 3 | B | D | D | D | A | B |
| Comparison 4 | B | C | C | C | B | B |
| Comparison 5 | B | C | D | D | A | B |
| Comparison 6 | B | B | B | B | C | C |
| Comparison 7 | D | D | D | D | B | B |
| Comparison 8* | B | D | D | D | C | C |
| Comparison 9 | B | C | D | D | A | A |
| Comparison 10 | C | C | D | D | A | C |

*Unit of each of the amounts of the film components in Comparison 8: (g/m²)

Best Mode 2 for Carrying Out the Invention

The present inventors made extensive and intensive investigations regarding a film composition capable of solving the foregoing problems. As a result, it has been found that by forming a surface-treated film on a surface of a zinc based plated steel sheet or an aluminum based plated steel sheet by using a surface treatment composition obtained by compositely adding a nickel compound, an aluminum compound and a fluorine-containing compound in prescribed proportions to a specified titanium-containing aqueous liquid and further optionally adding appropriate amounts of an organic phosphoric acid compound, a vanadic acid compound, a zirconium carbonate compound and an aqueous organic resin, a surface-treated steel sheet having excellent corrosion resistance, heat discoloration resistance and resistance to blackening is obtained.

The surface-treated steel sheet of the invention has a prescribed film deposition amount of a surface-treated film formed by applying on a surface of a zinc based plated steel sheet or an aluminum based plated steel sheet a surface treatment composition (I) in which a titanium-containing aqueous liquid (A) obtained by mixing at least one titanium compound selected from a hydrolyzable titanium compound, a low condensate of a hydrolyzable titanium compound, titanium hydroxide and a low condensate of titanium hydroxide with aqueous hydrogen peroxide is blended with prescribed proportions of a nickel compound (B), an aluminum compound (C) and a fluorine-containing compound (D) and further optionally a prescribed proportion of at least one member selected from the group consisting of an organic phosphoric acid compound (E), a vanadic acid compound (F), a zirconium carbonate compound (G), a water-soluble organic resin (H) and a water-dispersible organic resin (H), followed by drying. This surface-treated film does not contain hexavalent chromium.

Examples of the zinc based plated steel sheet as a base of the surface-treated steel sheet of the invention, which can be used, include a galvanized steel sheet, a Zn—Ni alloy plated steel sheet, a Zn—Fe alloy plated steel sheet (for example, an electroplated steel sheet and an alloyed molten zinc plated steel sheet), a Zn—Cr alloy plated steel sheet, a Zn—Mn alloy steel sheet, a Zn—Co alloy plated steel sheet, a Zn—Co—Cr alloy plated steel sheet, a Zn—Cr—Ni alloy plated steel sheet, a Zn—Cr—Fe alloy plated steel sheet, a Zn—Al alloy plated steel sheet (for example, a Zn-5 mass % Al alloy plated steel sheet and a Zn-55 mass % Al alloy plated steel sheet), a Zn—Mg alloy plated steel sheet, and a Zn—Al—Mg alloy plated steel sheet; and a zinc based composite plated steel sheet obtained by dispersing a metal oxide, a polymer or the like in a plated film of such a plated steel sheet (for example, a Zn—SiO$_2$ dispersed plated steel sheet). Also, a multilayered plated steel sheet obtained by plating two or more layers of the same kind or a different kind among the foregoing platings can be used.

Also, examples of the aluminum based plated steel sheet as a base of the surface-treated steel sheet of the invention, which can be used, include an aluminum plated steel sheet and an Al—Si alloy plated steel sheet.

Also, the plated steel sheet may be one prepared by subjecting a steel sheet surface to thin coating plating with Ni or the like in advance and applying each of the foregoing various platings thereon. As the plating method, all of methods which can be carried out among an electrolysis method (for example, electrolysis in an aqueous solution and electrolysis in a non-aqueous solvent), a hot-dip plating method and a vaporization method can be employed.

In order that in forming a surface-treated film on a surface of a plated film, deficiency or unevenness of the film may not be formed, the surface of the film can be previously subjected to a treatment such as alkaline degreasing, solvent degreasing and a surface modification treatment (for example, an alkaline surface modification treatment and an acidic surface modification treatment) as the need arises.

In order to prevent blackening under a use environment (a kind of oxidation phenomenon of plated surface) from occurring, the plated surface can be previously subjected to a surface modification treatment with an acidic or alkaline aqueous solution containing an iron-group metal ion (one or more kinds of an Ni ion, a Co ion and an Fe ion) as the need arises.

In the case where an electrogalvanized steel sheet is used as a substrate steel sheet, it is possible to add an iron-group metal ion (one or more kinds of an Ni ion, a Co ion and an Fe ion) in an electroplating bath for the purpose of preventing blackening from occurring, whereby 1 ppm by mass or more of these metals are contained in the plated film. In that case, an upper limit in the concentration of the iron-group metal in the plated film is not particularly limited.

In the surface-treated steel of the invention, the surface-treated film which is formed on a surface of the zinc based plated steel sheet or aluminum based plated steel sheet is formed by applying a surface treatment composition (I) containing, as essential components, a titanium-containing aqueous liquid (A), a nickel compound (B), an aluminum compound (C) and a fluorine-containing compound (D) and drying it.

The titanium-containing aqueous liquid (A) is a titanium-containing aqueous liquid obtained by mixing at least one titanium compound selected from a hydrolyzable titanium compound, a low condensate of a hydrolyzable titanium compound, titanium hydroxide and a low condensate of titanium hydroxide with aqueous hydrogen peroxide.

The foregoing hydrolyzable titanium compound is a titanium compound containing a hydrolyzable group which is bound directly to titanium and forms titanium hydroxide upon reaction with moisture such as water and water vapor. The hydrolyzable titanium compound may be one in which all of groups bound to titanium are a hydrolyzable group or one in which a part of groups bound to titanium is a hydrolyzable group.

The hydrolyzable group is not particularly limited so far as it is able to form titanium hydroxide upon reaction with moisture as described above. Examples thereof include a lower alkoxyl group and a group capable of forming a salt together with titanium (for example, a halogen atom such as chlorine, a hydrogen atom, and a sulfate ion).

As the hydrolyzable titanium compound containing a lower alkoxyl group as the hydrolyzable group, a tetraalkoxytitanium represented by the general formula, Ti(OR)$_4$ (wherein Rs may be the same or different and each represents an alkyl group having from 1 to 5 carbon atoms) is especially preferable. Examples of the alkyl group having from 1 to 5 carbon atoms include a methyl group, an ethyl group, an n-propyl group, an isopropyl group, an n-butyl group, an isobutyl group, a sec-butyl group, and a tert-butyl group. Representative examples of the hydrolyzable titanium compound containing, as the hydrolyzable group, a group capable of forming a salt together with titanium include titanium chloride and titanium sulfate.

The low condensate of a hydrolyzable titanium compound is a low condensate of the foregoing hydrolyzable titanium compounds each other. This low condensate may be one in which all of groups bound to titanium are a hydrolyzable group or one in which a part of groups bound to titanium is a hydrolyzable group.

With respect to the hydrolyzable titanium compound in which the hydrolyzable group is a group capable of forming a salt together with titanium (for example, titanium chloride and titanium sulfate), orthotitanic acid (titanium hydroxide gel) obtainable from reaction of an aqueous solution of that hydrolyzable titanium compound and an alkaline solution such as ammonia and sodium hydroxide can also be used as the low condensate.

As the low condensate of a hydrolyzable titanium compound and the low condensate of titanium hydroxide, a compound having a degree of condensation of from 2 to 30 can be used, and a compound having a degree of condensation of from 2 to 10 is especially preferably used. When the degree of condensation exceeds 30, a white precipitate is formed in mixing with hydrogen peroxide, whereby a stable titanium-containing aqueous liquid is not obtainable.

The hydrolyzable titanium compound, the low condensate of a hydrolyzable titanium compound, the titanium hydroxide and the low condensate of titanium hydroxide as described previously can be used singly or in admixture of two or more kinds thereof. Above all, a tetraalkoxytitanium which is a hydrolyzable titanium compound represented by the foregoing general formula is especially preferable.

As the titanium-containing aqueous liquid (A), conventionally known aqueous liquids can be used without particular limitations so far as they are a titanium-containing aqueous liquid obtained by mixing the foregoing titanium compound with aqueous hydrogen peroxide. Specific examples include those described below.

(i) A titanyl ion hydrogen peroxide complex or titanic acid (peroxo titanium hydrate) aqueous solution obtainable by adding aqueous hydrogen peroxide in a sol or gel of hydrous titanium oxide (see JP-A-63-35419 and JP-A-1-224220).

(ii) A titania film forming liquid obtainable through synthesis by acting aqueous hydrogen peroxide on a titanium hydroxide gel manufactured from an aqueous solution of titanium chloride or titanium sulfate and a basic solution (see JP-A-9-71418 and JP-A-10-67516).

In the case of obtaining this titania film forming liquid, an aqueous solution of titanium chloride or titanium sulfate containing a group capable of forming a salt together with titanium is allowed to react with an alkaline solution such as ammonia and sodium hydroxide, thereby precipitating a titanium hydroxide gel called as orthotitanic acid. Next, the titanium hydroxide gel is separated by decantation using water and thoroughly washed with water; aqueous hydrogen peroxide is further added; and excessive hydrogen peroxide is decomposed and removed, whereby a yellow, transparent, viscous liquid can be obtained.

The foregoing precipitated orthotitanic acid is in a gel state that it is converted into a high molecular weight compound due to polymerization of OHs each other or hydrogen bonding and cannot be used as a titanium-containing aqueous liquid as it is. When aqueous hydrogen peroxide is added in this gel, a part of OHs becomes in a peroxidized state, whereby the orthotitanic acid is dissolved as a peroxotitanate ion, or a polymer chain is cleaved to become in a low molecular weight state, whereby the orthotitanic acid becomes in a sol state of a sort; excessive hydrogen peroxide is decomposed into water and oxygen; and the resultant is able to be used as a titanium-containing aqueous liquid for forming an inorganic film.

This sol contains only an oxygen atom and a hydrogen atom other than titanium atom. Accordingly, in the case where the gel is changed to titanium oxide by drying or baking, since only water and oxygen are generated, the removal of a carbon component and a halogen component necessary for a sol-gel method or heat decomposition of a sulfate, etc. is not necessary, and a titanium oxide film with a relatively high density can be formed even at a low temperature.

(iii) A titanium oxide forming solution obtained by standing or heating a solution obtained by adding hydrogen peroxide to an aqueous solution of an inorganic titanium compound such as titanium chloride and titanium sulfate to form a peroxo titanium hydrate and then adding a basic substance to form a precipitate of a peroxo titanium hydrate polymer, subsequently removing dissolved components other than water as derived from at least the titanium-containing raw material solution and then acting hydrogen peroxide thereon (see JP-A-2000-247638 and JP-A-2000-247639).

The titanium-containing aqueous liquid (A) using, as a titanium compound, a hydrolyzable titanium compound and/or a low condensate thereof (hereinafter referred to as "hydrolyzable titanium compound a" for the sake of convenience of the description) can be obtained by allowing the hydrolyzable titanium compound a to react with aqueous hydrogen peroxide at a reaction temperature of from 1 to 70° C. for from about 10 minutes to 20 hours.

With respect to the titanium-containing aqueous solution (A) using this hydrolyzable titanium compound a, it is thought that by allowing the hydrolyzable titanium compound a to react with aqueous hydrogen peroxide, the hydrolyzable titanium compound a is hydrolyzed with water to form a hydroxyl group-containing titanium compound, with which is then coordinated hydrogen peroxide. The titanium-containing aqueous solution (A) is obtained due to the matter that this hydrolysis reaction and the coordination with hydrogen peroxide occur substantially at the same time, and a chelate liquid which is extremely high in stability in a room temperature region and durable against long-term storage is formed. A titanium hydroxide gel which is used in a conventional manufacturing method partially forms a three-dimensional structure due to Ti—O—Ti bonding, and this gel is essentially different in composition and stability from the titanium-containing aqueous liquid (A) obtained by the reaction of this gel with aqueous hydrogen peroxide.

When the titanium-containing aqueous liquid (A) using the hydrolyzable titanium compound a is subjected to heat treatment or autoclave treatment at 80° C. or higher, a titanium oxide dispersion containing an ultrafine particle of crystallized titanium oxide is obtained. When the foregoing heat treatment or autoclave treatment is performed at lower than 80° C., the crystallization of titanium oxide does not proceed sufficiently. It is desirable that the thus manufactured titanium oxide dispersion has an average particle size of titanium oxide ultrafine particle of not more than 10 nm, and preferably from about 1 to 6 nm. What the average particle size of the titanium oxide ultrafine particle is more than 10 nm is not preferable because film forming properties are lowered (in the case of forming a film after applying and drying, breakage is generated at a film thickness of 1 μm or more). The appearance of this titanium oxide dispersion is translucent. Such a titanium oxide dispersion can also be used as the titanium-containing aqueous liquid (A).

By applying a surface treatment composition (I) containing the titanium-containing aqueous liquid (A) using the hydrolyzable titanium compound a (the surface treatment composition is also called as "aqueous treatment liquid") on a surface of a plated steel sheet and drying (for example, heat drying at a low temperature), it is possible to form a minute titanium oxide-containing film (surface-treated film) which has excellent adhesion properties by itself.

The heating temperature after applying the surface treatment composition (I) is preferably, for example, not higher than 200° C., and especially preferably not higher than 150° C. By heat drying at such a temperature, it is possible to form an amorphous titanium oxide-containing film containing a hydroxyl group a little.

In the case where the titanium oxide dispersion obtained through the foregoing heat treatment or autoclave treatment at 80° C. or higher is used as the titanium-containing aqueous liquid (A), since a crystalline titanium oxide-containing film can be formed only by applying the surface treatment composition (I), it is useful as a coating material for materials which cannot be heat treated.

A titanium-containing aqueous liquid (A1) obtained by allowing the hydrolyzable titanium compound a to react with aqueous hydrogen peroxide in the presence of a titanium oxide sol can also be used as the titanium-containing aqueous liquid (A).

The foregoing titanium oxide sol is a sol in which an amorphous titania fine particle and/or an anatase type titania fine particle is dispersed in water (an aqueous organic solvent, for example, alcohols and alcohol ethers may be added as the need arises). As this titanium oxide sol, those which are conventionally known can be used, and for example, an amorphous titanyl sol obtained by dispersing a titanium oxide agglomerate such as (i) titanium agglomerates obtained by hydrolysis of a titanium-containing solution such as titanium sulfate and titanyl sulfate, (ii) titanium oxide agglomerates obtained by hydrolysis of an organotitanium compound such as titanium alkoxides and (iii) titanium oxide agglomerates obtained by hydrolysis or neutralization of a titanium halide solution such as titanium tetrachloride in water, or a sol obtained by baking the foregoing titanium oxide agglomerate to form an anatase type fine particle, which is then dispersed in water can be used.

In baking the foregoing amorphous titania, when baking is performed at a temperature of at least the crystallization temperature of anatase or higher, for example, a temperature of 400° C. to 500° C. or higher, the amorphous titania can be converted into anatase type titania. Examples of this aqueous sol of titanium oxide include TKS-201 (a trade name of Tayca corporation, an anatase type crystal form, average particle size: 6 nm), TA-15 (a trade name of Nissan Chemical Industries, Ltd., an anatase type crystal form), and STS-11 (a trade name of Ishihara Sangyo Kaisha, Ltd., an anatase type crystal form). In the titanium-containing aqueous liquid (A1), it is suitable that a mass ratio of the foregoing titanium sol $x$ to a hydrogen peroxide reaction product $y$ (a reaction product between the hydrolyzable titanium compound $a$ and aqueous hydrogen peroxide) is in the range of from 1/99 to 99/1, and preferably from about 10/90 to 90/10. When the mass ratio x/y is less than 1/99, an effect to be brought due to the addition of the titanium oxide sol is not obtained sufficiently from the standpoints of stability, photoreactivity and the like, whereas when it exceeds 99/1, film forming properties are inferior, and therefore, such is not preferable.

The titanium-containing aqueous liquid (A1) can be obtained by allowing the hydrolyzable titanium compound $a$ to react with aqueous hydrogen peroxide in the presence of the titanium oxide sol at a reaction temperature of from 1 to 70° C. for from about 10 minutes to 20 hours.

The formation behavior of the titanium-containing aqueous liquid (A1) and characteristics thereof are the same as those in the titanium-containing aqueous liquid (A) using the hydrolyzable titanium compound $a$ as described previously. In particular, by using the titanium oxide sol, a condensation reaction partially occurs at the synthesis, thereby suppressing thickening. As a reason for this, it is thought that the condensation reaction product is adsorbed on a surface of the titanium oxide sol, whereby the conversion into a high molecular weight compound in a solution state is suppressed.

When the titanium-containing aqueous liquid (A1) is subjected to heat treatment or autoclave treatment at 80° C. or higher, a titanium oxide dispersion containing a crystallized titanium oxide ultrafine particle is obtained. The temperature condition for obtaining this titanium oxide dispersion, the particle size of the crystallized titanium oxide ultrafine particle, the appearance of the dispersion, and the like are also the same as those in the titanium-containing aqueous liquid (A) using the hydrolyzable titanium compound $a$ as described previously. Such a titanium oxide dispersion can also be used as the titanium-containing aqueous liquid (A1).

Likewise the titanium-containing aqueous liquid (A) using the hydrolyzable titanium compound $a$ as described previously, by applying a surface treatment composition (I) containing the titanium-containing aqueous liquid (A1) on a surface of a plated steel sheet and drying (for example, heat drying at a low temperature), it is possible to form a minute titanium oxide-containing film (surface-treated film) which has excellent adhesion properties by itself.

The heating temperature after applying the surface treatment composition (I) is preferably, for example, not higher than 200° C., and especially preferably not higher than 150° C. By heat drying at such a temperature, it is possible to form an anatase type titanium oxide-containing film containing a hydroxyl group a little.

With respect to the foregoing titanium-containing aqueous liquid (A), the titanium-containing aqueous liquid (A) and the titanium-containing aqueous liquid (A1) each using the hydrolyzable titanium compound $a$ have excellent performance in storage stability, corrosion resistance and the like, and therefore, in the invention, it is especially preferred to use these aqueous liquids.

It is desirable that a blending proportion of aqueous hydrogen peroxide to the at least one titanium compound selected from a hydrolyzable titanium compound, a low condensate of a hydrolyzable titanium compound, titanium hydroxide and a low condensate of titanium hydroxide is from 1 to 100 parts by mass, and preferably from 1 to 20 parts by mass as reduced into hydrogen peroxide relative to 10 parts by mass of the titanium compound. When the blending proportion of aqueous hydrogen peroxide is less than 0.1 parts by mass as reduced into hydrogen peroxide, the formation of a chelate is not sufficient so that a cloudy precipitate is formed. On the other hand, when it exceeds 100 parts by mass, unreacted hydrogen peroxide is easy to remain and dangerous active oxygen is released during the storage, and therefore, such is not preferable.

Though a concentration of hydrogen peroxide in aqueous hydrogen peroxide is not particularly limited, it is preferably from about 3 to 30% by mass because a solids concentration of a formed liquid related to easiness of handling and coating workability is appropriate.

Other sols or pigments can also be added and dispersed in the titanium-containing aqueous liquid (A) as the need arises. Examples of additives include commercially available titanium sols and titanium oxide powders, mica, talc, silica, baryta and clays. One or more kinds of these additives can be added.

The content of the titanium-containing aqueous liquid (A) in the surface treatment composition (I) is from 1 to 100 g/L, and preferably from 5 to 50 g/L as solids from the standpoints of stability of the treatment liquid and the like.

The surface treatment composition (I) which is used in the invention is a composition obtained by compositely adding a nickel compound (B), an aluminum compound (C) and a fluorine-containing compound (D) in a titanium-containing aqueous liquid (A) and gives rise the following effects. That is, when the fluorine-containing compound (D) is added in the titanium-containing aqueous liquid (A), though corrosion resistance and storage stability are enhanced, resistance to blackening is deteriorated. On the other hand, when the nickel compound (B) is added, though resistance to blackening is enhanced, corrosion resistance is deteriorated. Then, by adding the aluminum compound (C), the deterioration of corrosion resistance is suppressed. Accordingly, it is thought that by compositely adding the nickel compound (B), the aluminum compound (C) and the fluorine-containing compound (D) in the titanium-containing aqueous liquid (A), all of corrosion resistance, storage stability and resistance to blackening become satisfactory.

The foregoing nickel compound (B) is blended for the purpose of enhancing the resistance to blackening, and examples of the nickel compound (B) is nickel acetate, nickel nitrate, and nickel sulfate. One or two or more kinds of these compounds can be used. Of these, nickel acetate is suitable from the standpoint of an enhancement of the resistance to blackening.

A blending amount of the nickel compound (B) is from 0.01 to 10 parts by mass, and preferably from 0.1 to 2 parts by mass relative to 100 parts by mass of solids of the titanium-containing aqueous liquid (A). When the blending amount of the nickel compound (B) is less than 0.01 parts by mass relative to 100 parts by mass of solids of the titanium-containing aqueous liquid (A), an improvement of the resistance to blackening is not sufficient, whereas when it exceeds 100 parts by mass, the corrosion resistance is deteriorated.

The foregoing aluminum compound (C) is blended for the purpose of enhancing the corrosion resistance, and examples of the aluminum compound (C) include aluminum nitrate, aluminum acetate, aluminum sulfate, aluminum oxide, aluminum acetyl acetonate, and an aluminate. One or two or more kinds of these compounds can be used. Of these, aluminum nitrate is good in solubility in water and is suitable from the standpoint of an enhancement of the corrosion resistance.

A blending amount of the aluminum compound (C) is from 1 to 100 parts by mass, and preferably from 5 to 30 parts by mass relative to 100 parts by mass of solids of the titanium-containing aqueous liquid (A). When the blending amount of the aluminum compound (C) is less than 1 part by mass relative to 100 parts by mass of solids of the titanium-containing aqueous liquid (A), an improvement of the corrosion resistance is not sufficient, whereas when it exceeds 100 parts by mass, the resistance to blackening is deteriorated.

In the invention, in particular, from the viewpoint of making both the resistance to blackening and the corrosion resistance compatible with each other, it is desirable that a mass ratio of the nickel compound (B) to the aluminum compound (C) is from 1/1 to 1/100, and preferably from 1/5 to 1/50 as solids.

The foregoing fluorine-containing compound (D) is blended for the purpose of enhancing the storage stability, corrosion resistance and resistance to water adhesion and the like. Examples of the fluorine-containing compound (D) include ammonium zirconium fluoride, potassium zirconium fluoride, zirconium hydrofluoride, ammonium titanium fluoride, hydrofluoric acid, and ammonium hydrofluoride, and one or two or more kinds of these compounds can be used. Of these, it is preferred to use at least one member selected from ammonium zirconium fluoride and zirconium hydrofluoride. In particular, ammonium zirconium fluoride is preferable from the standpoints of corrosion resistance after alkaline degreasing and resistance to water adhesion; and zirconium hydrofluoride is preferable from the standpoint of corrosion resistance after alkaline degreasing.

A blending amount of the fluorine-containing compound (D) is from 1 to 800 parts by mass, and preferably from 50 to 500 parts by mass relative to 100 parts by mass of solids of the titanium-containing aqueous liquid (A). When the blending amount of the fluorine-containing compound (D) is less than 1 part by mass relative to 100 parts by mass of solids of the titanium-containing aqueous liquid (A), improvements of the storage stability, corrosion resistance and resistance to water adhesion are not sufficient, whereas when it exceeds 800 parts by mass, the resistance to blackening is deteriorated.

In the surface treatment composition (I) which is used in the invention, the foregoing titanium-containing aqueous liquid (A) and the components (B) to (D) are essential. If desired, the surface treatment composition (I) can further contain at least one member selected from the group consisting of an organic phosphoric acid compound (E), a vanadic acid compound (F), a zirconium carbonate compound (G), a water-soluble organic resin (H) and a water-dispersible organic resin (H).

Examples of the foregoing organic phosphoric acid compound (E) include hydroxyl group-containing organic phosphorous acids such as 1-hydroxymethane-1,1-diphosphonic acid, 1-hydroxyethane-1,1-diphosphonic acid, and 1-hydroxypropane-1,1-diphosphonic acid; carboxyl group-containing organic phosphorous acids such as 2-hydroxyphosphonoacetic acid and 2-phosphono-butane-1,2,4-tricarboxylic acid; and salts thereof. One or two or more kinds of these compounds can be used.

The organic phosphoric acid compound (E) has an effect for enhancing the storage stability of the titanium-containing aqueous liquid (A). Above all, it is especially preferred to use 1-hydroxyethane-1,1-diphosphonic acid because its effect is large.

From the standpoints of resistance to water adhesion and the like, a blending amount of the organic phosphoric acid compound (E) is preferably from 1 to 400 parts by mass, and especially preferably from 20 to 300 parts by mass relative to 100 parts by mass of solids of the titanium-containing aqueous liquid (A). What the blending amount of the organic phosphoric acid compound (E) exceeds 400 parts by mass relative to 100 parts by mass of solids of the titanium-containing aqueous liquid (A) is not preferable because the resistance to water adhesion is deteriorated.

Examples of the foregoing vanadic acid compound (F) include lithium m-vanadate, potassium m-vanadate, sodium m-vanadate, ammonium m-vanadate, and vanadic anhydride. One or two or more kinds of these compounds can be used. Of these, ammonium m-vanadate is preferable from the standpoints of resistance to water adhesion and the like.

From the standpoints of corrosion resistance after alkaline degreasing of the film and the like, a blending amount of the vanadic acid compound (F) is preferably from 1 to 400 parts by mass, and especially preferably from 10 to 400 parts by mass relative to 100 parts by mass of solids of the titanium-containing aqueous liquid (A). What the blending amount of the vanadic acid compound (F) exceeds 400 parts by mass relative to 100 parts by mass of solids of the titanium-containing aqueous liquid (A) is not preferable because the corrosion resistance after alkaline degreasing is deteriorated.

Examples of the foregoing zirconium carbonate compound (G) include sodium, potassium, lithium and ammonium salts of zirconium carbonate. One or two or more kinds of these compounds can be used. Of these, ammonium zirconium carbonate is preferable from the standpoints of resistance to water adhesion and the like.

From the standpoints of corrosion resistance after alkaline degreasing of the film and the like, a blending amount of the zirconium carbonate compound (G) is preferably from 1 to 400 parts by mass, and especially preferably from 10 to 400 parts by mass relative to 100 parts by mass of solids of the titanium-containing aqueous liquid (A). What the blending amount of the zirconium carbonate compound (G) exceeds 400 parts by mass relative to 100 parts by mass of solids of the titanium-containing aqueous liquid (A) is not preferable because the corrosion resistance after alkaline degreasing is deteriorated.

The foregoing water-soluble organic resin and/or water-dispersible organic resin (H) is an organic resin capable of being dissolved or dispersed in water. As a method for making the organic resin soluble in water or dispersible in water, conventionally known methods can be applied. Specific examples of the organic resin which can be used include ones containing a functional group capable of being made soluble in water or dispersible in water by itself (for example, a hydroxyl group, a polyoxyalkylene group, a carboxyl group, an amino (imino) group, a sulfide group, and a phosphine group); ones in which in the case of an acidic resin (for example, carboxyl group-containing resins), a part or all of these functional groups have been optionally neutralized with an amine compound (for example, ethanolamine and triethylamine), ammonia water or an alkali metal hydroxide (for example, lithium hydroxide, sodium hydroxide, and potassium hydroxide); and ones in which in the case of a basic resin (for example, amino group-containing resins), a part or all of these functional groups have been optionally neutralized with a fatty acid (for example, acetic acid and lactic acid) or a mineral acid (for example, phosphoric acid).

Examples of the water-soluble or water-dispersible organic resin include epoxy based resins, phenol based resins, acrylic resins, urethane based resins, olefin-carboxylic acid based resins, nylon based resins, polyoxyalkylene chain-containing resins, polyvinyl alcohol, polyglycerin, carboxymethyl cellulose, hydroxymethyl cellulose, and hydroxyethyl cellulose. One or two or more kinds of these organic resins can be used. Of these, from the standpoint of storage stability of the surface treatment composition, it is especially preferred to use at least one organic resin selected from water-soluble or water-dispersible acrylic resins, urethane based resins and epoxy based resins; and from the standpoint a balance between storage stability and application performance of the surface treatment composition, it is especially preferred to use a water-soluble or water-dispersible acrylic resin as a major component.

The water-soluble or water-dispersible acrylic resin can be obtained by a conventionally known method, for example, an emulsion polymerization method, a suspension polymerization method, and a method in which a hydrophilic group-containing polymer is synthesized by solution polymerization and optionally made neutral or aqueous.

The foregoing hydrophilic group-containing polymer can be obtained by, for example, polymerizing an unsaturated monomer containing a hydrophilic group such as a carboxyl group, an amino group, a hydroxyl group, and a polyoxyalkylene group and optionally other unsaturated monomer.

From the standpoints of corrosion resistance and the like, the water-soluble or water-dispersible acrylic resin is preferably one obtained by copolymerization with styrene. The amount of styrene in the whole of unsaturated monomers is preferably from 10 to 60% by mass, and especially preferably from 15 to 50% by mass. From the standpoints of toughness of the film and the like, Tg (glass transition point) of the acrylic resin obtained by copolymerization is preferably from 30 to 80° C., and especially preferably from 40 to 70° C.

Examples of the foregoing carboxyl group-containing unsaturated monomer include acrylic acid, methacrylic acid, maleic acid, maleic anhydride, crotonic acid, and itaconic acid.

Examples of nitrogen-containing unsaturated monomers such as the foregoing amino group-containing unsaturated monomer include nitrogen-containing alkyl(meth)acrylates such as N,N-dimethylaminoethyl(meth)acrylate, N,N-diethylaminoethyl(meth)acrylate, and N-t-butylaminoethyl (meth)acrylate; polymerizable amides such as acrylamide, methacrylamide, N-methyl(meth)acrylamide, N-ethyl(meth) acrylamide, N-methylol(meth)acrylamide, N-methoxymethyl(meth)acrylamide, N-butoxymethyl(meth)acrylamide, N,N-di-methyl(meth)acrylamide, N,N-dimethylaminopropyl(meth)-acrylamide, and N,N-dimethylaminoethyl(meth) acrylamide; aromatic nitrogen-containing monomers such as 2-vinylpyridine, 1-vinyl-2-pyrrolidone, and 4-vinylpyridine; and allylamine.

Examples of the foregoing hydroxyl group-containing unsaturated monomer include monoesterified compounds between a polyhydric alcohol and acrylic acid or methacrylic acid, such as 2-hydroxyethyl(meth)acrylate, hydroxypropyl (meth)acrylate, 2,3-dihydroxybutyl(meth)acrylate, 4-hydroxybutyl(meth)acrylate, polyethylene glycol mono-(meth) acrylate, and polypropylene glycol mono(meth)acrylate; and compounds obtained by ring-opening polymerization of ξ-caprolactone on the foregoing monoesterified compound between a polyhydric alcohol and acrylic acid or methacrylic acid.

Examples of other unsaturated monomers include alkyl (meth)acrylates having from 1 to 24 carbon atoms, such as methyl (meth)acrylate, ethyl(meth)acrylate, n-propyl (meth) acrylate, isopropyl(meth)acrylate, n-butyl(meth)-acrylate, isobutyl(meth)acrylate, tert-butyl(meth)acrylate, 2-ethylhexyl acrylate, n-octyl(meth)acrylate, lauryl (meth)acrylate, trideyl(meth)acrylate, octadecyl (meth)acrylate, and isostearyl(meth)acrylate; and vinyl acetate.

One or two or more kinds of the foregoing unsaturated monomers can be used. The term "(meth)acrylate" as referred to in the present specification means an acrylate or a methacrylate.

As the foregoing urethane based resin, ones obtained by stably dispersing or dissolving a polyurethane composed of a polyol (for example, polyester polyols and polyether polyols) and a diisocyanate in water in the optional presence of a chain extender which is a low molecular weight compound containing two or more active hydrogens (for example, diols and diamines) can be suitably used, and conventionally known compounds can be widely used (see, for example, JP-B-42-24192, JP-B-42-24194, JP-B-42-5118, JP-B-49-986, JP-B-49-33104, JP-B-50-15027, and JP-B-53-29175).

As a method for stably dispersing or dissolving the polyurethane resin in water, for example, the following methods can be employed.

(1) A method of introducing an ionic group (for example, a hydroxyl group, an amino group, and a carboxyl group) into side chains or terminal ends of a polyurethane polymer to impart hydrophilicity and dispersing or dissolving the resulting polyurethane polymer in water due to self emulsification.

(2) A method of dispersing by force a polyurethane polymer in which the reaction has been completed or a polyurethane polymer in which a terminal isocyanate group is blocked with a blocking agent (for example, oximes, alcohols, phenols, mercaptans, amines, and sodium bisulfite) in water by using an emulsifier and a mechanical shear force. Also, a method of mixing a terminal isocyanate group-containing urethane polymer with water, an emulsifier and a chain extender and simultaneously performing dispersion and conversion into a high molecular weight material by using a mechanical shear force.

(3) A method of using a water-soluble polyol such as polyethylene glycol as a starting polyol of polyurethane and dispersing or dissolving it as a water-soluble polyurethane in water.

As the polyurethane based resin, a mixture of polyurethanes obtained by different methods of the foregoing dispersing or dissolving methods can also be used.

Examples of the diisocyanate which can be used for the synthesis of the foregoing polyurethane based resin include aromatic, alicyclic or aliphatic diisocyanates. Specific examples thereof include hexamethylene diisocyanate, tetramethylene diisocyanate, 3,3'-dimethoxy-4,4'-bi-phenylene diisocyanate, p-xylylene diisocyanate, m-xylylene diisocyanate, 1,3-(diisocyanatomethyl)cyclohexanone, 1,4-(diisocyanatomethyl)cyclohexanone, 4,4'-diisocyanato-cyclohexanone, 4,4'-methylenebis(cyclohexyl isocyanate), isophorone diisocyanate, 2,4-tolylene diisocyanate, 2,6-tolylene diisocyanate, p-phenylene diisocyanate, diphenylmethane diisocyanate, m-phenylene diisocyanate, 2,4-naphthalene diisocyanate, 3,3'-dimethyl-4,4'-bi-phenylene diisocyanate, and 4,4'-biphenylene diisocyanate. Of these, 2,4-tolylene diisocyanate, 2,6-tolylene diisocyanate, hexamethylene diisocyanate, and isophorone diisocyanate are especially preferable.

Examples of commercially available products of the polyurethane based resin include HYDRAN HW-330, HYDRAN HW-340 and HYDRAN HW-350 (all of which are a trade name of Dainippon Ink and Chemicals, Incorporated); and SUPERFLEX 100, SUPERFLEX 150, SUPERFLEX E-2500 and SUPERFLEX F-3438D (all of which are a trade name of Dai-ichi Kogyo Seiyaku Co., Ltd.).

As the foregoing epoxy based resin, cationic epoxy resins obtained by adding an amine to an epoxy resin; and modified epoxy resins such as acrylic modified epoxy resins and urethane-modified epoxy resins can be suitably used. Examples of the cationic epoxy resin include adducts of an epoxy compound with a primary mono- or polyamine, a secondary mono- or polyamine, a mixture of primary and secondary polyamines, etc. (see, for example, U.S. Pat. No. 3,984,299); adducts of an epoxy compound with a ketiminized primary amino group-containing secondary mono- or polyamine (see, for example, U.S. Pat. No. 4,017,438); and etherification reaction products of an epoxy compound with a ketiminized primary amino group-containing hydroxyl compound (see, for example, JP-A-59-43013)

Preferred examples of the epoxy based resin include those having a number average molecular weight of from 400 to 4,000, and especially from 800 to 2,000 and an epoxy equivalent of from 190 to 2,000, and especially from 400 to 1,000. Such an epoxy based resin can be obtained by, for example, reaction of a polyphenol compound and epichlorohydrin. Examples of the polyphenol compound include bis(4-hydroxyphenyl)-2,2-propane, 4,4-dihydroxybenzophenone, bis(4-hydroxyphenyl)-1,1,ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxyl-diphenylsulfone, phenol novolak, and cresol novolak.

From the standpoints of uniformity of the resulting film and the like, a blending amount of the water-soluble resin and/or water-dispersible organic resin (H) is preferably not more than 30 parts by mass, and especially preferably from 5 to 20 pats by mass relative to 100 parts by mass of solids of the titanium-containing aqueous liquid (A). When the blending amount of the water-soluble resin and/or water-dispersible organic resin (H) exceeds 30 parts by mass, the heat discoloration resistance is easily lowered.

The surface treatment composition (I) can further contain, for example, a silane coupling agent, a resin fine particle, an etching agent such as inorganic phosphoric acid compounds, a heavy metal compound other than the components as defined in the invention, a thickener, a surfactant, a wettability imparting agent (for example, polyethylene waxes, fluorocarbon waxes, and carnauba wax), a rust proofing agent, a coloring pigment, an extender pigment, a rustproof pigment, and a dye as the need arises.

The surface treatment component (I) can be used upon being diluted with a hydrophilic solvent, for example, methanol, ethanol, isopropyl alcohol, ethylene glycol based solvents, and propylene glycol based solvents. The deposition amount of the surface-treated film formed from the surface treatment composition (I) is from 0.1 to 2.0 g/m$^2$, and preferably from 0.2 to 1.5 g/m$^2$. When the film deposition amount is less than 0.1 g/m$^2$, the corrosion resistance is deteriorated, whereas when it exceeds 2.0 g/m$^2$, the film is easily broken, and the corrosion resistance is lowered.

In manufacturing the surface-treated steel sheet of the invention, the surface treatment composition (I) (treatment liquid) containing as major components the titanium-containing aqueous liquid (A), the nickel compound (B), the aluminum compound (C) and the fluorine-containing compound (D) as described previously and further optionally containing at least one member of the organic phosphoric acid compound (E), the vanadic acid compound (F), the zirconium carbonate compound (G) and the water-soluble organic resin and/or water-dispersible organic resin (H) is applied on a surface of the zinc based plated steel sheet or aluminum based plated steel sheet and dried without washing with water.

The titanium-containing aqueous liquid (A) and the surface treatment composition (I) may further contain the foregoing other addition components as the need arises.

With respect to the application method of the surface treatment composition (treatment liquid), for example, a combination of spraying and roll squeezing and roll coater application can be arbitrarily employed; and with respect to a drying system after application, for example, a hot air drying system, a dielectric heating system, and an electric furnace system can be arbitrarily employed.

A drying temperature of the applied surface treatment composition (treatment liquid) is from about 60 to 200° C. When the drying temperature is lower than 60° C., the film formation is insufficient so that the film is inferior in corrosion resistance and the like. On the other hand, even when drying is performed at a sheet temperature exceeding 200° C., an effect for enhancing the corrosion resistance adaptive with the drying temperature is not obtained, and there is a possibility that the corrosion resistance is rather lowered. It is thought that this is caused due to the matter that a crack is formed in the film by heat.

EXAMPLE 2

A titanium-containing aqueous liquid (A) and components (B) to (H) used in a surface treatment composition are shown below.

[Preparation of Titanium-containing Aqueous Liquid (A)]

PREPARATION EXAMPLE 1

Titanium-containing Aqueous Liquid T1

To a solution prepared by making 5 cc of a 60% by mass solution of titanium tetrachloride to 500 cc with distilled water, ammonia water (1/9) was added dropwise, thereby precipitating titanium hydroxide. After washing with distilled water, 10 cc of a 30% by mass solution of aqueous hydrogen peroxide was added, and the mixture was stirred to obtain a yellow, translucent, viscous titanium-containing aqueous liquid T1 containing titanium.

PREPARATION EXAMPLE 2

Titanium-containing Aqueous Liquid T2

To a mixture of 10 parts by mass of 30% by mass aqueous hydrogen peroxide and 100 parts by mass of deionized water, a mixture of 10 parts by mass of tetraisopropoxy titanium and 10 parts by mass of isopropanol was added dropwise at 20° C. over one hour while stirring. Thereafter, the resulting mixture was aged at 25° C. for 2 hours to obtain a yellow, transparent, slightly viscous titanium-containing aqueous liquid T2.

PREPARATION EXAMPLE 3

Titanium-containing Aqueous Liquid T3

A titanium-containing aqueous liquid T3 was obtained under the same preparation condition as in Preparation Example 2, except for using tetra-n-butoxy titanium in place of the tetraisopropoxy titanium as used in Preparation Example 2.

PREPARATION EXAMPLE 4

Titanium-containing Aqueous Liquid T4

A titanium-containing aqueous liquid T4 was obtained under the same preparation condition as in Preparation Example 2, except for using a trimer of tetraisopropoxy titanium in place of the tetraisopropoxy titanium as used in Preparation Example 2.

PREPARATION EXAMPLE 5

Titanium-containing Aqueous Liquid T5

A titanium-containing aqueous liquid T5 was obtained under the same preparation condition as in Preparation Example 2, except for using aqueous hydrogen peroxide in an amount of three times that in Preparation Example 2 and adding dropwise it at 50° C. over one hour and further aging at 60° C. for 3 hours.

PREPARATION EXAMPLE 6

Titanium-containing Aqueous Liquid T6

A whitish yellow, translucent titanium-containing aqueous liquid T6 was obtained by further heat treating the titanium-containing aqueous liquid T3 as prepared in Preparation Example 3 at 95° C. for 6 hours.

PREPARATION EXAMPLE 7

Titanium-containing Aqueous Liquid T7

To a mixture of 5 parts by mass (solids) of "TKS-203" (a trade name of Tayca Corporation, a titanium oxide sol), 10 parts by mass of 30% by mass of aqueous hydrogen peroxide and 100 parts by mass of deionized water, a mixture of 10 parts by mass of tetraisopropoxy titanium and 10 parts by mass of isopropanol was added dropwise at 10° C. over one hour while stirring. Thereafter, the resulting mixture was aged at 10° C. for 24 hours to obtain a yellow, transparent, slightly viscous titanium-containing aqueous liquid T7.

[Nickel Compound (B)]
  B1: Nickel acetate
  B2: Nickel nitrate
  B3: Nickel sulfate

[Aluminum Compound (C)]
  C1: Aluminum nitrate
  C2: Aluminum acetate
  C3: Aluminum acetyl acetonate

[Fluorine-Containing Compound (D)]
  D1: Ammonium zirconium fluoride
  D2: Zirconium hydrofluoride
  D3: Sodium zirconium fluoride
  D4: Potassium zirconium fluoride

[Organic Phosphoric Acid Compound (E)]
  E1: 1-Hydroxymethane-1,1-diphosphonic acid
  E2: 1-Hydroxyethane-1,1-diphosphonic acid

[Vanadic Acid Compound (F)]
  F1: Ammonium m-vanadate
  F2: Sodium m-vanadate

[Zirconium Carbonate Compound (G)]
  G1: Ammonium zirconium carbonate
  G2: Sodium zirconium carbonate

[Water-Soluble or Water-Dispersible Organic Resin (H)]
  H1: SUPERFLEX E-2500 (a trade name of Dai-ichi Kogyo Seiyaku Co., Ltd., an aqueous polyurethane resin)
  H2: VYLONAL MD-1100 (a trade name of Toyobo Co., Ltd., an aqueous polyester resin)
  H3: ADEKA RESIN EM-0718 (a trade name of Adeka Corporation, an aqueous epoxy resin)

Each of plated steel sheets as shown in Table 6 was used as a base steel sheet of a surface-treated steel sheet.

A surface treatment composition in which the foregoing titanium-containing aqueous liquid (A) and components (B) to (H) were properly blended was applied on a surface of the plated steel sheet and dried at a prescribed drying temperature for 5 seconds, thereby preparing a test specimen. These test specimens were evaluated for heat discoloration resistance, corrosion resistance and resistance to blackening in the following methods. The obtained results are shown in Tables 7 to 10 along with the surface treatment composition applied to each of the test specimens and an application condition thereof.

(1) Heat Discoloration Resistance:

A test specimen was heated in an infrared image furnace at a sheet temperature of 500° C. for 30 seconds, and after keeping for 30 seconds, when the test specimen was allowed to cool spontaneously to room temperature, the surface appearance was visually observed. Criteria of the evaluation are as follows.

A: Not discolored
  B: Discolored pale yellow
  C: Discolored yellow to brown (2) Corrosion Resistance:

A test specimen in which end parts and back surface thereof were tape sealed was provided for a salt water spray test in conformity with JIS Z2371-2000, and a test period at which an area rate of white rusting was 5% was measured. Criteria of the evaluation are as follows.

A: 120 hours or more
  B: 96 hours or more and less than 120 hours
  C: 48 hours or more and less than 96 hours
  D: Less than 48 hours (3) Resistance to Blackening:

A test specimen was allowed to stand in a thermostat controlled in an atmosphere at a temperature of 80° C. and a relative humidity of 95% for 24 hours, and a change of whiteness degree (L value) was calculated in terms of $\Delta L$ [(L value after the test)−(L value before the test)]. Criteria of the evaluation are as follows.

A: $\Delta L \geq -5.0$
  B: $-5.0 > \Delta L \geq -10.0$
  C: $-10.0 > \Delta L$

TABLE 6

| No. | Kind | Plating deposition amount per surface (g/m²) |
|---|---|---|
| 1 | Electrogalvanized steel sheet | 50 |
| 2 | Molten zinc plated steel sheet | 60 |
| 3 | Alloyed molten zinc plated steel sheet (Fe: 10 mass %) | 45 |
| 4 | Zn—Ni alloy plated steel sheet (Ni: 12 mass %) | 20 |
| 5 | Molten Zn—Al alloy plated steel sheet (Al: 55 mass %) | 90 |
| 6 | Molten Zn-5 mass % Al-0.5 mass % Mg alloy plated steel sheet | 90 |
| 7 | Molten aluminum plated steel sheet (Al—Si alloy, Si: 6 mass %) | 60 |
| 8 | Zn—Al—Mg alloy plated steel sheet (Al: 6 mass %, Mg: 3 mass %) | 120 |
| 9 | Molten Zn—Mg alloy plated steel sheet (Mg: 0.5 mass %) | 150 |

In Tables 7 and 9, *1 to *10 each represents as follows.
*1: Plated steel sheets Nos. 1 to 9 as described in Table 6
*2: Titanium-containing aqueous liquids T1 to T7 as described in the present specification
*3: Nickel compounds B1 to B3 as described in the present specification
*4: Aluminum compounds C1 to C3 as described in the present specification
*5: Fluorine-containing compounds D1 to D4 as described in the present specification
*6: Organic phosphoric acid compounds E1 and E2 as described in the present specification
*7: Vanadic acid compounds F1 and F2 as described in the present specification
*8: Zirconium carbonate compounds G1 and G2 as described in the present specification
*9: Water-soluble or water-dispersible organic resins H1 to H3 as described in the present specification
*10: Mass (g) of solids in one liter of surface treatment composition (aqueous treatment liquid)

TABLE 7

| | | Composition of surface treatment composition | | | | | | | |
|---|---|---|---|---|---|---|---|---|---|
| | Plated steel sheet No. | Titanium-containing aqueous liquid (A) | | Nickel compound (B) | | Aluminum compound (C) | | Fluorine-containing compound (D) | |
| No. | *1 | Kind *2 | Blending amount *10 | Kind *3 | Blending amount *10 | Kind *4 | Blending amount *10 | Kind *5 | Blending amount *10 |
| Invention 1 | 2 | T1 | 10 | B1 | 0.003 | C1 | 2 | D1 | 15 |
| Invention 2 | 2 | T2 | 10 | B1 | 0.02 | C1 | 2 | D1 | 15 |
| Invention 3 | 2 | T3 | 10 | B1 | 0.4 | C1 | 2 | D1 | 15 |
| Invention 4 | 2 | T4 | 10 | B1 | 0.6 | C1 | 2 | D1 | 15 |
| Invention 5 | 2 | T5 | 10 | B1 | 0.002 | C1 | 0.2 | D1 | 15 |
| Invention 6 | 2 | T6 | 10 | B1 | 0.05 | C1 | 1 | D1 | 15 |
| Invention 7 | 2 | T7 | 10 | B1 | 0.5 | C1 | 4 | D1 | 15 |
| Invention 8 | 2 | T2 | 10 | B1 | 0.7 | C1 | 8 | D1 | 15 |
| Invention 9 | 2 | T2 | 10 | B1 | 0.002 | C1 | 2 | D1 | 1 |
| Invention 10 | 2 | T2 | 10 | B1 | 0.01 | C1 | 2 | D1 | 8 |
| Invention 11 | 2 | T2 | 10 | B1 | 0.06 | C1 | 2 | D1 | 20 |
| Invention 12 | 4 | T2 | 10 | B1 | 0.8 | C1 | 5 | D1 | 70 |
| Invention 13 | 5 | T2 | 10 | B2 | 0.02 | C1 | 2 | D1 | 15 |
| Invention 14 | 2 | T2 | 10 | B3 | 0.02 | C1 | 2 | D1 | 15 |
| Invention 15 | 2 | T2 | 10 | B1/B2 | 0.01/0.1 | C1 | 2 | D1 | 15 |
| Invention 16 | 1 | T2 | 10 | B1 | 0.02 | C2 | 2 | D1 | 15 |
| Invention 17 | 2 | T2 | 10 | B1 | 0.02 | C3 | 2 | D1 | 15 |
| Invention 18 | 3 | T2 | 10 | B1 | 0.02 | C1/C2 | 2/1 | D1 | 15 |
| Invention 19 | 4 | T2 | 10 | B1 | 0.01 | C1 | 2 | D2 | 7 |
| Invention 20 | 5 | T2 | 10 | B1 | 0.06 | C1 | 2 | D2 | 15 |
| Invention 21 | 6 | T2 | 10 | B1 | 0.8 | C1 | 2 | D2 | 80 |
| Invention 22 | 7 | T2 | 10 | B1 | 0.02 | C1 | 2 | D3 | 15 |
| Invention 23 | 8 | T2 | 10 | B1 | 0.02 | C1 | 2 | D4 | 15 |
| Invention 24 | 9 | T2 | 10 | B1 | 0.02 | C1 | 2 | D1/D2 | 10/5 |
| Invention 25 | 2 | T2 | 10 | B1 | 0.02 | C1 | 2 | D1 | 15 |
| Invention 26 | 2 | T2 | 10 | B1 | 0.02 | C1 | 2 | D1 | 15 |
| Invention 27 | 2 | T2 | 10 | B1 | 0.02 | C1 | 2 | D1 | 15 |
| Invention 28 | 2 | T2 | 10 | B1 | 0.02 | C1 | 2 | D1 | 15 |

TABLE 7-continued

| | Composition of surface treatment composition ||||||||
| | Organic phosphoric acid compound (E) || Vanadic acid compound (F) || Zirconium carbonate compound (G) || Aqueous organic resin (H) ||
| No. | Kind *6 | Blending amount *10 | Kind *7 | Blending amount *10 | Kind *8 | Blending amount *10 | Kind *9 | Blending amount *10 |
|---|---|---|---|---|---|---|---|---|
| Invention 1 | — | — | — | — | — | — | — | — |
| Invention 2 | — | — | — | — | — | — | — | — |
| Invention 3 | — | — | — | — | — | — | — | — |
| Invention 4 | — | — | — | — | — | — | — | — |
| Invention 5 | — | — | — | — | — | — | — | — |
| Invention 6 | — | — | — | — | — | — | — | — |
| Invention 7 | — | — | — | — | — | — | — | — |
| Invention 8 | — | — | — | — | — | — | — | — |
| Invention 9 | — | — | — | — | — | — | — | — |
| Invention 10 | — | — | — | — | — | — | — | — |
| Invention 11 | — | — | — | — | — | — | — | — |
| Invention 12 | — | — | — | — | — | — | — | — |
| Invention 13 | — | — | — | — | — | — | — | — |
| Invention 14 | — | — | — | — | — | — | — | — |
| Invention 15 | — | — | — | — | — | — | — | — |
| Invention 16 | — | — | — | — | — | — | — | — |
| Invention 17 | — | — | — | — | — | — | — | — |
| Invention 18 | — | — | — | — | — | — | — | — |
| Invention 19 | — | — | — | — | — | — | — | — |
| Invention 20 | — | — | — | — | — | — | — | — |
| Invention 21 | — | — | — | — | — | — | — | — |
| Invention 22 | — | — | — | — | — | — | — | — |
| Invention 23 | — | — | — | — | — | — | — | — |
| Invention 24 | — | — | — | — | — | — | — | — |
| Invention 25 | — | — | — | — | — | — | — | — |
| Invention 26 | — | — | — | — | — | — | — | — |
| Invention 27 | E1 | 1 | — | — | — | — | — | — |
| Invention 28 | E1 | 15 | — | — | — | — | — | — |

TABLE 8

| | Application condition || Characteristics |||
| No. | Drying temperature (° C.) | Film deposition amount (g/m$^2$) | Heat discoloration resistance | Corrosion resistance | Resistance to blackening |
|---|---|---|---|---|---|
| Invention 1 | 80 | 0.5 | A | B | A |
| Invention 2 | 80 | 0.5 | A | B | A |
| Invention 3 | 80 | 0.5 | A | B | A |
| Invention 4 | 80 | 0.5 | A | B | A |
| Invention 5 | 80 | 0.5 | A | B | A |
| Invention 6 | 80 | 0.5 | A | B | A |
| Invention 7 | 80 | 0.5 | A | B | A |
| Invention 8 | 80 | 0.5 | A | B | A |
| Invention 9 | 80 | 0.5 | A | B | A |
| Invention 10 | 80 | 0.5 | A | B | A |
| Invention 11 | 80 | 0.5 | A | B | A |
| Invention 12 | 80 | 0.5 | A | B | A |
| Invention 13 | 80 | 0.5 | A | B | A |
| Invention 14 | 80 | 0.5 | A | B | A |
| Invention 15 | 80 | 0.5 | A | B | A |
| Invention 16 | 80 | 0.5 | A | B | A |
| Invention 17 | 80 | 0.5 | A | B | A |
| Invention 18 | 80 | 0.5 | A | B | A |
| Invention 19 | 80 | 0.5 | A | B | A |
| Invention 20 | 80 | 0.5 | A | B | A |
| Invention 21 | 80 | 0.5 | A | B | A |
| Invention 22 | 80 | 0.5 | A | B | A |
| Invention 23 | 80 | 0.5 | A | B | A |
| Invention 24 | 80 | 0.5 | A | B | A |
| Invention 25 | 80 | 0.2 | A | B | A |
| Invention 26 | 80 | 1.5 | A | B | A |
| Invention 27 | 80 | 0.5 | A | B | A |
| Invention 28 | 80 | 0.5 | A | A | A |

TABLE 9

| No. | Plated steel sheet *1 | Titanium-containing aqueous liquid (A) Kind *2 | Titanium-containing aqueous liquid (A) Blending amount *10 | Nickel compound (B) Kind *3 | Nickel compound (B) Blending amount *10 | Aluminum compound (C) Kind *4 | Aluminum compound (C) Blending amount *10 | Fluorine-containing compound (D) Kind *5 | Fluorine-containing compound (D) Blending amount *10 | Organic phosphoric acid compound (E) Kind *6 | Organic phosphoric acid compound (E) Blending amount *10 | Vanadic acid compound (F) Kind *7 | Vanadic acid compound (F) Blending amount *10 | Zirconium carbonate compound (G) Kind *8 | Zirconium carbonate compound (G) Blending amount *10 | Aqueous organic resin (H) Kind *9 | Aqueous organic resin (H) Blending amount *10 |
|---|---|---|---|---|---|---|---|---|---|---|---|---|---|---|---|---|---|
| Invention 29 | 2 | T2 | 10 | B1 | 0.02 | C1 | 2 | D1 | 15 | E1 | 35 | — | — | — | — | — | — |
| Invention 30 | 2 | T2 | 10 | B1 | 0.02 | C1 | 2 | D1 | 15 | E2 | 15 | — | — | — | — | — | — |
| Invention 31 | 2 | T2 | 10 | B1 | 0.02 | C1 | 2 | D1 | 15 | — | — | F1 | 1 | — | — | — | — |
| Invention 32 | 2 | T2 | 10 | B1 | 0.02 | C1 | 2 | D1 | 15 | — | — | F1 | 20 | — | — | — | — |
| Invention 33 | 2 | T2 | 10 | B1 | 0.02 | C1 | 2 | D1 | 15 | — | — | F1 | 35 | — | — | — | — |
| Invention 34 | 2 | T2 | 10 | B1 | 0.02 | C1 | 2 | D1 | 15 | E1 | 15 | F1 | 20 | — | — | — | — |
| Invention 35 | 2 | T2 | 10 | B1 | 0.02 | C1 | 2 | D1 | 15 | E1 | 15 | F2 | 20 | — | — | — | — |
| Invention 36 | 2 | T2 | 10 | B1 | 0.02 | C1 | 2 | D1 | 15 | — | — | — | — | G1 | 1 | — | — |
| Invention 37 | 2 | T2 | 10 | B1 | 0.02 | C1 | 2 | D1 | 15 | — | — | — | — | G1 | 15 | — | — |
| Invention 38 | 2 | T2 | 10 | B1 | 0.02 | C1 | 2 | D1 | 15 | — | — | — | — | G1 | 30 | — | — |
| Invention 39 | 2 | T2 | 10 | B1 | 0.02 | C1 | 2 | D1 | 15 | E1 | 15 | F1 | 20 | G1 | 15 | — | — |
| Invention 40 | 2 | T2 | 10 | B1 | 0.02 | C1 | 2 | D1 | 15 | E1 | 15 | F1 | 20 | G1 | 15 | — | — |
| Invention 41 | 2 | T2 | 10 | B1 | 0.02 | C1 | 2 | D1 | 15 | E1 | 15 | F1 | 20 | G2 | 15 | — | — |
| Invention 42 | 2 | T2 | 10 | B1 | 0.02 | C1 | 2 | D1 | 15 | — | — | — | — | — | — | H1 | 0.5 |
| Invention 43 | 2 | T2 | 10 | B1 | 0.02 | C1 | 2 | D1 | 15 | — | — | — | — | — | — | H1 | 1 |
| Invention 44 | 2 | T2 | 10 | B1 | 0.02 | C1 | 2 | D1 | 15 | — | — | — | — | — | — | H1 | 2 |
| Invention 45 | 2 | T2 | 10 | B1 | 0.02 | C1 | 2 | D1 | 15 | — | — | — | — | — | — | H2 | 2 |
| Invention 46 | 2 | T2 | 10 | B1 | 0.02 | C1 | 2 | D1 | 15 | — | — | — | — | — | — | H3 | 2 |
| Invention 47 | 2 | T2 | 10 | B1 | 0.02 | C1 | 2 | D1 | 15 | E1 | 15 | — | — | G1 | 15 | H1 | 2 |
| Invention 48 | 2 | T2 | 10 | B1 | 0.02 | C1 | 2 | D1 | 15 | E1 | 15 | F1 | 20 | G1 | 15 | H1 | 2 |
| Comparison 1 | 2 | T2 | 10 | — | — | C1 | 2 | D1 | 15 | — | — | — | — | — | — | — | — |
| Comparison 2 | 2 | T2 | 10 | B1 | 1.5 | C1 | 2 | D1 | 15 | — | — | — | — | — | — | — | — |
| Comparison 3 | 2 | T2 | 10 | B1 | 0.02 | — | — | D1 | 15 | — | — | — | — | — | — | — | — |
| Comparison 4 | 2 | T2 | 10 | B1 | 0.02 | C1 | 12 | D1 | 15 | — | — | — | — | — | — | — | — |
| Comparison 5 | 2 | T2 | 10 | B1 | 0.02 | C1 | 2 | — | — | — | — | — | — | — | — | — | — |
| Comparison 6 | 2 | T2 | 10 | B1 | 0.8 | C1 | 2 | D1 | 100 | — | — | — | — | — | — | — | — |
| Comparison 7 | 2 | T2 | 10 | B1 | 0.02 | C1 | 2 | D1 | 15 | — | — | — | — | — | — | — | — |
| Comparison 8 | 2 | — | — | — | — | — | — | — | — | | | | | | | | |
| Comparison 9 | 2 | T2 | 10 | B1 | 0.02 | C1 | 2 | D1 | 15 | | | | | | | | |

TABLE 9-continued

| | | | | | | | | |
|---|---|---|---|---|---|---|---|---|
| Comparison 8 | — | — | — | — | — | — | — | — |
| Comparison 9 | — | — | — | — | — | — | H1 | 4 |

TABLE 10

| | Application condition | | Characteristics | | |
|---|---|---|---|---|---|
| No. | Drying temperature (° C.) | Film deposition amount (g/m²) | Heat discoloration resistance | Corrosion resistance | Resistance to blackening |
| Invention 29 | 80 | 0.5 | A | B | A |
| Invention 30 | 80 | 0.5 | A | A | A |
| Invention 31 | 80 | 0.5 | A | B | A |
| Invention 32 | 80 | 0.5 | A | A | A |
| Invention 33 | 80 | 0.5 | A | B | A |
| Invention 34 | 80 | 0.5 | A | A | A |
| Invention 35 | 80 | 0.5 | A | A | A |
| Invention 36 | 80 | 0.5 | A | B | A |
| Invention 37 | 80 | 0.5 | A | A | A |
| Invention 38 | 80 | 0.5 | A | B | A |
| Invention 39 | 80 | 0.5 | A | A | A |
| Invention 40 | 80 | 0.5 | A | A | A |
| Invention 41 | 80 | 0.5 | A | A | A |
| Invention 42 | 80 | 0.5 | A | A | A |
| Invention 43 | 80 | 0.5 | A | A | A |
| Invention 44 | 80 | 0.5 | A | B | A |
| Invention 45 | 80 | 0.5 | A | B | A |
| Invention 46 | 80 | 0.5 | A | B | A |
| Invention 47 | 80 | 0.5 | A | B | A |
| Invention 48 | 80 | 0.3 | A | B | A |
| Comparison 1 | 80 | 0.5 | A | B | C |
| Comparison 2 | 80 | 0.5 | A | D | A |
| Comparison 3 | 80 | 0.5 | A | D | A |
| Comparison 4 | 80 | 0.5 | A | B | B |
| Comparison 5 | 80 | 0.5 | A | C | A |
| Comparison 6 | 80 | 0.5 | A | B | C |
| Comparison 7 | 80 | 3.0 | C | B | B |
| Comparison 8 | — | — | A | D | A |
| Comparison 9 | 80 | 3.0 | B | B | A |

The surface-treated steel sheet of the invention is excellent in heat discoloration resistance because the surface-treated film is composed mainly of inorganic components which are not accompanied with coloration formation or discoloration due to heating. Also, the surface-treated steel sheet of the invention has excellent corrosion resistance and resistance to blackening comparable to surface-treated steel sheets having a chromate film because the inorganic components thereof have high barrier properties.

The invention claimed is:

1. A surface-treated steel sheet comprising a zinc based plated steel sheet having thereon a surface-treated film of from 0.05 to 1.0 μm in thickness containing titanium, nickel, aluminum and fluorine, the surface-treated film having a titanium deposition amount of from 0.01 to 0.5 g/m² and containing from 0.01 to 5 parts by mass of nickel, from 0.1 to 25 parts by mass of aluminum and from 1 to 500 parts by mass of fluorine relative to 100 parts by mass of titanium.

2. The surface-treated steel sheet according to claim 1, wherein the surface-treated film contains at least one member selected from the group consisting of from 2 to 1,000 parts by mass of zirconium, from 1 to 300 parts by mass of phosphorus and from 1 to 300 parts by mass of vanadium relative to 100 parts by mass of titanium.

3. A surface-treated steel sheet comprising a zinc based plated steel sheet or an aluminum based plated steel sheet having thereon a surface-treated film having a film deposition amount of from 0.1 to 2.0 g/m² as formed by applying and drying a surface treatment composition containing a titanium-containing aqueous liquid obtained by mixing aqueous hydrogen peroxide with at least one titanium compound selected from the group consisting of a hydrolyzable titanium compound, a low condensate of a hydrolyzable titanium compound, titanium hydroxide and a low condensate of titanium hydroxide and in amounts relative to 100 parts by mass of solids of the titanium-containing aqueous liquid, from 0.01 to 10 parts by mass of a nickel compound, from 1 to 100 parts by mass of an aluminum compound and from 1 to 800 parts by mass of a fluorine-containing compound.

4. The surface-treated steel sheet according to claim 3, wherein the fluorine-containing compound is at least one member selected from the group consisting of ammonium zirconium fluoride and zirconium hydrofluoride.

5. The surface-treated steel sheet according to claim 3, wherein the surface treatment composition further contains at least one member selected from the group consisting of from 1 to 400 parts by mass of an organic phosphoric acid compound, from 1 to 400 parts by mass of a vanadic acid and from 1 to 400 parts by mass of a zirconium carbonate compound relative to 100 parts by mass of solids of the titanium-containing aqueous liquid.

6. The surface-treated steel sheet according to claim 3, wherein the surface treatment composition further contains at least one resin selected from the group consisting of a water-soluble organic resin and a water-dispersible organic resin in an amount of not more than 30 parts by mass relative to 100 parts by mass of solids of the titanium containing aqueous liquid.

7. The surface-treated steel sheet according to claim 4, wherein the surface treatment composition further contains at least one resin selected from the group consisting of a water-soluble organic resin and a water-dispersible organic resin in an amount of not more than 30 parts by mass relative to 100 parts by mass of solids of the titanium containing aqueous liquid.

8. The surface-treated steel sheet according to claim 5, wherein the surface treatment composition further contains at least one resin selected from the group consisting of a water-soluble organic resin and a water-dispersible organic resin in an amount of not more than 30 parts by mass relative to 100 parts by mass of solids of the titanium containing aqueous liquid.

* * * * *